US009998221B2

(12) United States Patent
Boroson et al.

(10) Patent No.: US 9,998,221 B2
(45) Date of Patent: Jun. 12, 2018

(54) LINK ARCHITECTURE AND SPACECRAFT TERMINAL FOR HIGH RATE DIRECT TO EARTH OPTICAL COMMUNICATIONS

(71) Applicants: Don M. Boroson, Needham, MA (US); Bryan S. Robinson, Arlington, MA (US); Bryan M. Reid, Chelmsford, MA (US); Jamie W. Burnside, Lexington, MA (US); Farzana I. Khatri, Lexington, MA (US); Steven Constantine, Westford, MA (US)

(72) Inventors: Don M. Boroson, Needham, MA (US); Bryan S. Robinson, Arlington, MA (US); Bryan M. Reid, Chelmsford, MA (US); Jamie W. Burnside, Lexington, MA (US); Farzana I. Khatri, Lexington, MA (US); Steven Constantine, Westford, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 149 days.

(21) Appl. No.: 14/991,377

(22) Filed: Jan. 8, 2016

(65) Prior Publication Data

US 2016/0204865 A1   Jul. 14, 2016

Related U.S. Application Data

(60) Provisional application No. 62/101,955, filed on Jan. 9, 2015, provisional application No. 62/101,976, filed
(Continued)

(51) Int. Cl.
*H04B 10/00* (2013.01)
*H04B 10/118* (2013.01)
(Continued)

(52) U.S. Cl.
CPC ....... *H04B 10/118* (2013.01); *H04B 7/18513* (2013.01); *H04B 10/1121* (2013.01);
(Continued)

(58) Field of Classification Search
CPC .............. H04B 10/118; H04B 7/18513; H04B 10/1121; H04B 10/29; H04B 10/40; H04B 10/61; H04J 14/02
(Continued)

(56) References Cited

U.S. PATENT DOCUMENTS 5,367,371 A    11/1994   Krawczyk
5,450,223 A    9/1995   Wagner et al.
(Continued)

FOREIGN PATENT DOCUMENTS

CA        2794400 A1 *  10/2011  ......... H04B 7/18513
EP        2073404 A1     6/2009
WO     WO2011/020654    *  3/2011

OTHER PUBLICATIONS

U.S. Appl. No. 14/991,386, filed Jan. 8, 2016, Boroson et al.
(Continued)

*Primary Examiner* — Amritbir Sandhu
(74) *Attorney, Agent, or Firm* — Cooley LLP

(57) ABSTRACT

A satellite in low-Earth orbit (LEO) or medium-Earth orbit (MEO) with a modern image sensor and/or other remote sensing device can collect data at rates of 10 Mbps or higher. At these collection rates, the satellite can accumulate more data between its passes over a given ground station than it can transmit to the ground station in a single pass using radio-frequency (RF) communications. Put differently, the sensors fill the spacecraft's memory faster than the spacecraft can empty it. Fortunately, free-space optical communications signals can carry far more data than RF communications signals. In particular, a spacecraft can transmit
(Continued)

over 1 Tb of data in a single pass using burst wavelength-division multiplexed (WDM) optical signals. Each burst may last seconds to minutes, and can include tens to hundreds of WDM channels, each of which is modulated at 10 Gbps or more.

22 Claims, 13 Drawing Sheets

Related U.S. Application Data on Jan. 9, 2015, provisional application No. 62/101,975, filed on Jan. 9, 2015.

(51) Int. Cl.
*H04B 10/112* (2013.01)
*H04J 14/02* (2006.01)
*H04B 7/185* (2006.01)
*H04B 10/29* (2013.01)
*H04B 10/40* (2013.01)
*H04B 10/61* (2013.01)

(52) U.S. Cl.
CPC ............ *H04B 10/29* (2013.01); *H04B 10/40* (2013.01); *H04B 10/61* (2013.01); *H04J 14/02* (2013.01)

(58) Field of Classification Search
USPC .................................................. 398/118–131
See application file for complete search history.

(56) References Cited

U.S. PATENT DOCUMENTS

| | | | |
|---|---|---|---|
| 5,508,932 A | 4/1996 | Achkar et al. | |
| 5,710,652 A | 1/1998 | Bloom et al. | |
| 5,903,545 A | 5/1999 | Sabourin et al. | |
| 6,098,929 A | 8/2000 | Falbel | |
| 6,087,646 A | 11/2000 | Didinsky | |
| 6,147,644 A | 11/2000 | Castles et al. | |
| 6,268,944 B1 | 7/2001 | Szapiel | |
| 6,297,897 B1 | 10/2001 | Czichy et al. | |
| 6,411,414 B1 | 6/2002 | Abate et al. | |
| 6,445,496 B1 | 9/2002 | Presby et al. | |
| 6,535,734 B1 | 3/2003 | Miller et al. | |
| 6,570,695 B1 | 5/2003 | Pribil et al. | |
| 6,661,975 B1 | 12/2003 | Hall et al. | |
| 6,674,576 B1 | 1/2004 | Carollo et al. | |
| 6,778,779 B1 | 8/2004 | Shay et al. | |
| 6,834,164 B1 | 12/2004 | Chan | |
| 6,868,237 B2 | 3/2005 | Willebrand et al. | |
| 7,197,248 B1 | 3/2007 | Vorontsov et al. | |
| 7,277,641 B1 | 10/2007 | Gleckman | |
| 7,289,736 B1 | 10/2007 | Graves | |
| 7,292,789 B1 | 11/2007 | Capots et al. | |
| 7,373,673 B1 | 5/2008 | Krill et al. | |
| 7,343,099 B2 | 11/2008 | Wirth et al. | |
| 7,457,326 B2 | 11/2008 | Rogers et al. | |
| 7,609,972 B2 | 10/2009 | Cunningham et al. | |
| 7,631,839 B1 | 12/2009 | Duncan et al. | |
| 7,826,752 B1* | 11/2010 | Zanoni ............... | H04B 10/5055 398/186 |
| 7,920,794 B1 | 4/2011 | Whaley et al. | |
| 7,925,167 B1 | 4/2011 | Kozubal et al. | |
| 8,526,328 B2 | 9/2013 | Hunt et al. | |
| 8,989,579 B2* | 3/2015 | Arnold ................ | H04B 10/118 370/316 |
| 9,048,950 B2* | 6/2015 | Chen .................. | H04B 10/613 |
| 9,304,259 B1 | 4/2016 | Yasumura | |
| 9,723,386 B1 | 8/2017 | Ni et al. | |
| 9,813,151 B2 | 11/2017 | Kingsbury et al. | |
| 9,866,324 B2 | 1/2018 | Clemmensen | |
| 2002/0041575 A1 | 4/2002 | Karabinis et al. | |
| 2002/0121574 A1 | 9/2002 | Davis | |
| 2002/0167702 A1 | 11/2002 | Badesha et al. | |
| 2002/0167708 A1* | 11/2002 | Tsao ................... | H04B 10/118 398/204 |
| 2003/0050008 A1 | 3/2003 | Patterson et al. | |
| 2003/0091276 A1 | 5/2003 | Wang et al. | |
| 2003/0095302 A1* | 5/2003 | Schuster ............ | H04B 10/1121 398/164 |
| 2003/0172208 A1 | 9/2003 | Fidler | |
| 2004/0148083 A1 | 1/2004 | Arakawa et al. | |
| 2004/0127158 A1 | 7/2004 | Dai et al. | |
| 2004/0172403 A1 | 9/2004 | Steele et al. | |
| 2004/0249964 A1 | 12/2004 | Mougel et al. | |
| 2005/0100339 A1* | 5/2005 | Tegge, Jr. ........... | H04B 10/118 398/125 |
| 2006/0024061 A1 | 2/2006 | Wirth et al. | |
| 2006/0030258 A1 | 2/2006 | Mocquard et al. | |
| 2007/0019605 A1* | 1/2007 | Rioux ................ | H04B 7/18513 370/347 |
| 2007/0031150 A1 | 2/2007 | Fisher et al. | |
| 2007/0031151 A1 | 2/2007 | Cunningham et al. | |
| 2008/0002981 A1* | 1/2008 | Valley ................ | H04B 7/18521 398/121 |
| 2008/0123738 A1* | 5/2008 | Katsavounidis ..... | H04N 19/159 375/240.01 |
| 2008/0181108 A1* | 7/2008 | Hashmi ................. | H04L 47/10 370/231 |
| 2009/0034654 A1 | 2/2009 | Inukai et al. | |
| 2009/0131046 A1 | 5/2009 | Karabinis et al. | |
| 2010/0021166 A1 | 1/2010 | Way | |
| 2010/0090866 A1 | 4/2010 | Chen et al. | |
| 2010/0201566 A1 | 8/2010 | Wyler | |
| 2010/0226495 A1 | 9/2010 | Kelley et al. | |
| 2011/0004405 A1 | 1/2011 | Hutchin | |
| 2011/0169688 A1 | 7/2011 | Wyler | |
| 2011/0239421 A1 | 10/2011 | Tertitsk | |
| 2011/0274429 A1* | 11/2011 | Caplan ............... | H04B 10/5561 398/65 |
| 2012/0008961 A1 | 1/2012 | Chen et al. | |
| 2012/0109425 A1 | 5/2012 | Janson et al. | |
| 2012/0199697 A1 | 8/2012 | Nagabhushan et al. | |
| 2012/0276898 A1 | 11/2012 | Korb et al. | |
| 2012/0292531 A1* | 11/2012 | Grudinin ............ | G01N 21/6458 250/459.1 |
| 2013/0156439 A1* | 6/2013 | Arnold .......................... | 398/125 |
| 2013/0182620 A1 | 7/2013 | Chaffee et al. | |
| 2013/0183040 A1* | 7/2013 | Elahmadi ........... | H04B 10/2507 398/79 |
| 2013/0193303 A1 | 8/2013 | Smith et al. | |
| 2013/0208082 A1 | 8/2013 | Williams et al. | |
| 2013/0293414 A1 | 11/2013 | Robinson et al. | |
| 2014/0004853 A1 | 1/2014 | Mitchell | |
| 2014/0016932 A1 | 1/2014 | Coleman et al. | |
| 2014/0016941 A1* | 1/2014 | Coleman ........... | H04B 7/18521 398/121 |
| 2014/0222472 A1 | 8/2014 | Platzer | |
| 2014/0241731 A1 | 8/2014 | Peach et al. | |
| 2014/0266420 A1 | 9/2014 | Brown | |
| 2014/0270749 A1 | 9/2014 | Miniscalco et al. | |
| 2014/0294399 A1 | 10/2014 | Markowski et al. | |
| 2014/0341586 A1 | 11/2014 | Wyler | |
| 2014/0354477 A1 | 12/2014 | Robinson | |
| 2014/0354996 A1 | 12/2014 | Fontecchio et al. | |
| 2014/0362875 A1* | 12/2014 | Le Kernec .......... | H04B 10/112 370/535 |
| 2014/0376001 A1 | 12/2014 | Swanson | |
| 2015/0078250 A1 | 3/2015 | Mineta et al. | |
| 2015/0110491 A1* | 4/2015 | Gayrard ............ | H03M 13/2906 398/79 |
| 2015/0125157 A1* | 5/2015 | Chao ................. | H04B 10/118 398/122 |
| 2015/0131703 A1 | 5/2015 | Batter et al. | |
| 2015/0207562 A1 | 7/2015 | Brumley, II et al. | |
| 2015/0215041 A1* | 7/2015 | Pechner ............ | H04B 10/1123 398/130 |
| 2015/0298827 A1 | 10/2015 | Nguyen et al. | |
| 2016/0013882 A1 | 1/2016 | Hashimoto | |
| 2016/0033649 A1 | 2/2016 | Mathews et al. | |

(56) References Cited

U.S. PATENT DOCUMENTS

| | | | | |
|---|---|---|---|---|
| 2016/0043800 | A1* | 2/2016 | Kingsbury | H04B 10/118 398/125 |
| 2016/0087711 | A1* | 3/2016 | Tayrac | H04B 7/18513 370/316 |
| 2016/0112124 | A1* | 4/2016 | Juarez | H04B 10/112 398/118 |
| 2016/0192303 | A1* | 6/2016 | Tender | H04B 7/18513 370/316 |
| 2016/0204851 | A1* | 7/2016 | Li | H04B 7/18515 370/316 |
| 2016/0204866 | A1* | 7/2016 | Boroson | H04B 10/1121 398/97 |
| 2016/0204899 | A1* | 7/2016 | Kojima | H04J 14/0257 714/776 |
| 2016/0308601 | A1 | 10/2016 | Mochida | |
| 2017/0264365 | A1* | 9/2017 | Takahashi | H04B 10/118 |

OTHER PUBLICATIONS

U.S. Appl. No. 15/054,546, filed Feb. 26, 2016, Boroson et al.
U.S. Appl. No. 14/991,394, filed Jan. 8, 2016, Boroson et al.
International Search Report and Written Opinion from International Application No. PCT/US2016/019732, 13 pages, dated Nov. 29, 2016.
Kramer, "EDRS (European Data Relay Satellite) Constellation," EO Sharing Earth Observation Resources, Oct. 21, 2013, pp. 1-9.
International Search Report and Written Opinion dated Jun. 29, 2015 from International Application No. PCT/US2015/019890.
International Search Report and Written Opinion dated Jul. 26, 2016 from International Application No. PCT/US16/12644.
International Search Report and Written Opinion dated Jul. 26, 2016 from International Application No. PCT/US16/12643.
International Search Report and Written Opinion dated Feb. 24, 2016 from International Application No. PCT/US2015/043638.
Office Action dated Apr. 22, 2016 from U.S. Appl. No. 14/644,425.
Office Action dated Sep. 8, 2016 from U.S. Appl. No. 14/817,985.
Notice of Allowance dated Dec. 30, 2016 from U.S. Appl. No. 14/644,425.
International Search Report and Written Opinion from International Application No. PCT/US16/12641, dated May 11, 2016.
Aerocube-OCSD A, B (IOCPS A, B), accessed at: http://space.skyrocket.de/doc_sdat/aerocube-ocsd.htm, 2 pages, Dec. 5, 2014.
Aherne, M. R. et al., "Aeneas-Colony I Meets Three-Axis Pointing", 25th Annual AIAA/USU Conference on Small Satellites, pp. 1-11, Aug. 8-11, 2011.
Alluru, S. R. et al., "An Optical Payload for Cubesats," 24$^{th}$ Annual AIAA/USU Conference on Small Satellites, pp. 1-13, Aug. 9, 2010.
Alluru, Seshupriya Reddy, "A System Design of an Optical Wireless Communication System for Cubesats," University of Florida Master's Thesis, 78 pages, Dec. 2010.
Andrews, L. C. et al. "Laser Beam Propagation through Random Media", Second Edition (SPIE Press Monograph vol. PM152). SPIE—The International Society for Optical Engineering, ISBN-13: 978-0819459480, 2005.
Bingham, B. et al., "The Road to a Three-Axis-Stabilized CubeSat," 32nd Annual AAS Rocky Mountain Guidance and Control Conference, vol. 133, pp. 607-613 Jan. 30 thru Feb. 4, 2009.
Biswas, A. et al., "The Atmospheric Channel", Deep Space Communications, Chapter 3, pp. 121-213, 2006.
Buchen, E. et al., "2014 Nano/Microsatellite Market Assessment," Spaceworks Enterprises, Inc., (SEI), Atlanta, GA, pp. 1-18, 2014.
Caplan, D. O., et al., "Demonstration of 2.5-Gslot/s optically-preamplified M-PPM with 4 photons/bit receiver sensitivity," Optical Fiber Conference (OFC), Paper PDP32, 3 pages, 2005.
Caplan, D.O., et al., "Laser communication transmitter and receiver design," J. Opt. Fiber Commun. Rep. 4, pp. 225-362, 2007.
Caplan, D.O., et al., "Power-efficient Noise-insensitive Optical Modulation for High-sensitivity Laser Communications," CLEO, 2 pages, Jun. 8-13, 2014.

Caplan, D. O. et al., "Parallel Direct Modulation Laser Transmitters for High-speed High-sensitivity Laser Communications," CLEO: Applications and Technology, PDPB12, Optical Society of America, 2 pages, 2011.
Caplan, D. O., "A technique for measuring and optimizing modulator extinction ratio," IEEE, Conference on Lasers and Electro-Optics, 2000 (CLE0 2000), pp. 335-336, May 7-12, 2000.
Chandrasekhar, S., et al., "Chirp-Managed Laser and MLSE-RX Enables Transmission Over 1200 km at 1550 nm in a DWDM Environment in NZDSF at 10 Gb/s Without Any Optical Dispersion Compensation" Photonics Tech. Letters, vol. 18, pp. 1560-1562, Jul. 2006.
Coffee, B. et al., "Propagation of CubeSats in LEO using NORAD Two Line Element Sets: Accuracy and Update Frequency", AIAA Guidance, Navigation, and Control Conference, pp. 1-15, Aug. 19-22, 2013.
Crassidis, J. L. et al., "A Survey of Nonlinear Attitude Estimation Methods", pp. 1-48, 2007.
"Cubesat Design Specification", Rev. 13, The CubeSat Program, Cal Poly SLO, pp. 1-42, Feb. 20, 2014.
Edwards, B. L., et al., "Overview of the Laser Communications Relay Demonstration Project," Space Ops Conference, pp. 1-11, Jun. 11-15, 2012.
Excelitas Technologies GmbH & Co. KG, "Thermopile Detector—TPD 1T 0214 G9/3850,"Sensor Solutions—Product Specification, Revision—Jan. 24, 2013, 4 pages.
Gangestad, J. W. et al., "Operations, orbit determination, and Formation Control of the Aerocube-4 Cubesats," (SSC13-X-4), Proc. of 27th AIAA/USU Conference on Small Satellites, pp. 1-8, Aug. 10, 2013.
Hanson, J., et al. "The EDSN Intersatellite Communications Architecture," Proc. of 28th AIAA/USU Conference on Small Satellites, p. 111, Aug. 4-7, 2014.
Hemmati, H., "Laser-Communications with Lunar CubeSat," Jet Propulsion Laboratory, California Institute of Technology, pp. 1-11, Apr. 11, 2013.
Hashmall, J.A., et al., "An Algorithm for Converting Static Earth Sensor Measurements Into Earth Observation Vectors", NASA Technical Memorandum from the proceedings of the Flight Mechanics Symposium, pp. 1-13, Oct. 2003.
Janson, S. et al., "The NASA Optical Communication and Sensor Demonstration Program: An Update." (SSC14-VI-1), Proc. of 28th Annual AIAA/USU Conference on Small Satellites, MIT: Nanosatellite Optical Downlink Experiment (NODE), The Aerospace Corporation 2014, pp. 1-10, Aug. 5, 2014.
Janson, S. et al., "Attitude Control on the Pico Satellite Colar Cell Testbed-2", Presentation of Proceedings of the 26$^{th}$ Annual AIAA/USU Conference on Small Satellites, pp. 1-13, Aug. 13, 2012.
Janson, S. et al., "The NASA Optical Communication and Sensor Demonstration Program" (SSC13-II-1), The Aerospace Corporation, pp. 1-19, Aug. 12, 2013.
Kingsbury, R.W. et al., "Design of a Free-Space Optical Communication Module for Small Satellites," (SSC14-IX-6), 28$^{th}$ AIAA/USU Small Satellite Conference, pp. 1-10, Apr. 12, 2014.
Kingsbury, R.W., et al., "Two-Stage Control for CubeSat Optical Communications," CalPoly CubeSat Developers Workshop, pp. 1-29, Apr. 24, 2014.
Kingsbury, R.W., et al., "Fast-Steering Solutions for CubeSat-Scale Optical Communication," Proc. of International Conference on Space Optics, pp. 1-6, Oct. 7-10, 2014.
Klofas, B. et al., "A Survey of CubeSat Communication Systems: 2009-2012", Proceedings of 2013 CalPoly CubeSat Developers' Workshop, pp. 1-41, Apr. 2013.
Kneller, E.W. et al., "Cadet: A High Data Rate Software Defined Radio for SmallSat Applications", (SSC12-X-4), 26th Annual AIAA/USU Conference on Small Satellites, pp. 1-10, 2012.
LADEE, NASA's LADEE Mission, taken from http://www.nasa.gov/mission_pages/ladee/main/index.html, 2 pages, Dec. 5, 2014.
Lambert, S. et al, "Laser Communications in Space", Optical Engineering, vol. 35, No. 5, pp. 1513-1515, May 1996.
Lee, C-H et al., "Transmission of Directly Modulated 2.5-Gb/s Signals Over 250-km of Nondispersion-Shifted Fiber by Using a

(56) References Cited

OTHER PUBLICATIONS

Spectral Filtering Method," IEEE Photonics Technology Letters, IEEE vol. 8, No. 12, pp. 1725-1727, Dec. 1996.
Li, J. et al., "Design of Attitude Control Systems for CubeSat-Class Nanosatellite", Research Article Journal of Control Science and Engineering, vol. 13, pp. 1-9, Apr. 24, 2013.
Liebe C.C. et al., "Accuracy Performance of Star Trackers-A Tutorial" IEEE Transactions on Aerospace and Electronic Systems, vol. 38 No. 2, pp. 587-599, Apr. 2002.
Mahgerefteh, D. et al., "Penalty-free propagation over 600 km of nondispersion-shifted fiber at 2.5 Gb/s using a directly laser modulated transmitter", CLEO, 1 pages, 1999.
Maryland Aerospace Inc., MAI-400 Reference Manual, 2 pages, Apr. 29, 2014.
Merrelli, Aronne, "The Atmospheric Information Content of Earth's Far Infrared Spectrum", A Dissertation approved for the degree of Doctor of Philosophy (Atmospheric and Oceanic Sciences), 135 pages, Nov. 26, 2012.
National Aeronautics and Space Administration, "Laser Communications Relay Demonstration, the Next Step in Optical Communications", 2 pages, Jun. 26, 2013.
Nguyen, T. et al., "Development of a pointing, acquisition, and tracking system for a CubeSat optical communication module," in SPIE OPTO, vol. 9354, pp. 93540O-1 to 93540O-9, Mar. 26, 2015.
Oaida, B.V. et al., OPALS: An Optical Communications Technology Demonstration from the International Space Station, Aerospace Conference, IEEE, pp. 1-20, 2013, Mar. 2-9, 2013.
Oaida, B.V. et al. "Optical link design and validation testing of the Optical Payload for Lasercomm Science (OPALS) system", Free-Space Laser Communication Technologies XXVI, Proc. of SPIE, vol. 8971, pp. 89710U-1 to 89710U-15, Mar. 6, 2014.
Phenneger, M.C., et al., "Infrared Horizon Sensor Modeling for Attitude Determination and Control: Analysis and Mission Experience", NASA Technical Memorandum, vol. 86181, 239 pages, Mar. 1985 (Part 1 of 2).
Phenneger, M.C., et al., "Infrared Horizon Sensor Modeling for Attitude Determination and Control: Analysis and Mission Experience", NASA Technical Memorandum, vol. 86181, 239 pages, Mar. 1985 (Part 2 of 2).
Pong, C. et al., High-Precision Pointing and Attitude Determination and Control on ExoplanetSat, AIAA Guidance, Navigation, and Control Conference, pp. 1-24, Aug. 13-16, 2012.
Pong, C. et al., "A Dual-Spinning, Three-Axis-Stabilized CubeSat for Earth Observations," AIAA Guidance, Navigation, and Control (GNC) Conference, pp. 1-24, 2013.
Pong, C. et al., "High-Precision Pointing and Attitude Estimation and Control Algorithms for Hardware-Constrained Spacecraft", PhD Thesis, Massachusetts Institute of Technology, pp. 1-254, May 22, 2014.
Robinson, B.S. et al., "The Lunar Laser Communications Demonstration", International Conference on Space Optical Systems and Applications (ICSOS), pp. 54-57, IEEE, May 11-13, 2011.
Sarda, K. et al., "Canadian Advanced Nanospace Experiment 2 Orbit Operations: Two Years of Pushing the Nanosatellite Performance Envelope", ESA Small Satellites, Services and Systems Symposium, 20 pages, 2010.
Sebacher, K.S. et al., "Laser Crosslink Configurations for RF Satellite Communications Systems", Military Communications Conference, MILCOM 1985, IEEE, vol. 1, pp. 98-103.
Schwarzenberg-Czerny, A, "The BRITE Nano-Satellite Constellation Mission," Proc. of 38th COSPAR Scientific Assembly, pp. 1-17, Jul. 15-18, 2010.
Sniegowski, J.J. et al., "Development, test and evaluation of MEMS micro-mirrors for free-space optical communications," Free-Space Laser Communications IV, Proceedings of SPIE, vol. 5550, pp. 299-312, Dec. 3, 2014.
Staehle, R.L. et al., "Interplanetary CubeSats: Opening the Solar System to a Broad Community at Lower Cost", Journal of Small Satellites, pp. 1-10, Dec. 8, 2012.
Shirasaki, M. et al., "Fibre Transmission Properties of Optical Pulses Produced Through Direct Phase Modulation of DFB Laser Diode," Electron. Letters, vol. 24, pp. 486-488, Apr. 14, 1988.
Swartwout, Michael, "The First One Hundred CubeSats: A Statistical Look," Journal of Small Satellites, vol. 2, pp. 213-233, 2013.
Vodhanel, R. S. et al., "Performance of Directly Modulated DFB Lasers in 10-Gb/s ASK, FSK, and DPSK Lightwave Systems," J. Lightwave Technology, vol. 8, pp. 1379-1386, Sep. 1990.
Vodhanel, R.S. et al., "Ten-to-Twenty Gigabit-per-Second Modulation Performance of 1.5-mm Distributed Feedback Lasers for Frequency-Shift Keying Systems," J. Lightwave Technology, vol. 7, pp. 1454-1460, Oct. 1989.
Unhelkar, V.V. et al., "Satellite Attitude Estimation using Sun Sensors, Horizon Sensors and Gyros", A dissertation approved for the degree of Master of Technology and Bachelors of Technology in Aerospace Engineering, 133 pages, Jun. 25, 2012.
Unhelkar, V.V. et al., "Spacecraft Attitude Determination with Sun Sensors, Horizon Sensors and Gyros: Comparison of Steady-State Kalman Filter and Extended Kalman Filter", Proceedings of the Itzhack Y. Bar-Itzhack Memorial Symposium on Estimation, Navigation, and Spacecraft Control, 22 pages, Oct. 2012.
Contestabile, G. et al., "40 Gb/s WDM NRZ-DPSK All-Optical Clock Recovery and Data Demodulation based on a Periodic Bragg Filter," Optical Fiber Communication/National Fiber Optic Engineers Conference, 3 pages, Feb. 24-28, 2008.
Dillow, Clay, "Record-Breaking New Fiber Optic Cables Transmit 100 Terabits per Second," Popular Science, pp. 1-3, Apr. 29, 2011.
Epple, Bernhard, et al., "Discussion on Design Aspects for Free-Space Optical Communication Terminals," IEEE Communications Magazine, vol. 45, Issue 10, pp. 62-69. Oct. 8, 2007.
Fields, R. et al., "5.625 Gbps Bidirectional Laser Communications Measurements Between the NFIRE Satellite and an Optical Ground Station", International Conference on Space Optical Systems and Applications, May 11-13, 2011, pp. 44-53.
Hamid Hemmati, et al., Near-Earth Laser Communications (book), Print ISBN: 978-0-8247-5381-8, CRC Press Mar. 3, 2009.
Henniger, H. et al., "Free-space optical transmission improves land-mobile communications," SPIE Newsroom, Jan. 9, 2007, pp. 1-3.
Henniger, H. and Wilfert, O., "An Introduction to Free-space Optical Communications", Radioengineering Journal, vol. 19, No. 2, Jun. 2010, pp. 203-212.
Horwath, J., et al., "Broadband Backhaul Communication for Stratospheric Platforms: The Stratospheric Optical Payload Experiment (STROPEX)," Proc. SPIE 6304, Free-Space Laser Communications VI, 63041N, Sep. 1, 2006, 12 pages.
Kubo-oka, Toshihiro, et al., "Optical Communication Experiment Using Very Small TrAnsponder Component on a Small RISESAT", Proc. International Conference on Space Optical Systems and Applications (ICOS), Oct. 9-12, 2012, 6 pages.
Moores, John D. et al., "Architecture Overview and Data Summary of a 5.4 km Free-Space Laser Communications Experiment", Proc. of SPIE, vol. 7464, Aug. 2009, 9 pages.
Miniscalco, W.J., et al., "Optical Space-Time Division Multiple Access," Journal of Lightwave Technology, vol. 30, No. 11, pp. 1771-1785, Jun. 1, 2012.
Stotts, L. B. et al., "Hybrid Optical RF Airborne Communications," Proc. of IEEE, vol. 97, No. 6, pp. 1109-1127, Jun. 2009.
Stotts, L.B, et al, "Optical Communications in Atmospheric Turbulence," SPIE 2009, vol. 7464, Aug. 21, 2009, 17 pages.
Tyler, Glen A. et al., "Image-position error associated with a quadrant detector", Journal of Optical Society of America, vol. 72, No. 6, Jun. 1982, pp. 804-808.
Santanu, D. et al., "Requirements and Challenges for Tactical Free-Space Lasercomm", Military Communications Conference, IEEE MILCOM, Nov. 16-19, 2008, pp. 1-5.
Walther, F.G, et al, "Air-to-Ground Lasercom System Demonstration Design Overview and Results Summary," Proc. of SPIE, Aug. 24, 2010, vol. 7814, 9 pages.
Darrell, L., "The Internet—Brought to You by Drones and Balloons", Jun. 27, 2014, 2 pages, downloaded from http://www.bidnessetc.com/business/the-internet-brought-to-you-by-drones-and-balloons/ on Jan. 13, 2016.

(56) References Cited

OTHER PUBLICATIONS

Perry, T.S., "Start-up Profile: Skybox Imaging", May 1, 2013, 9 pages, downloaded from http:/spectrum.ieee.org/at-work/innovation/startup-profile-skybox-imaging on Jan. 13, 2016.
http://www.digitalglobe.com downloaded Jan. 13, 2016, 3 pages.
https://www.planet.com/, downloaded Jan. 7, 2013, 6 pages.
https://www.viasat.com/, downloaded Jan. 13, 2016, 3 pages.
http://intelsat.com, downloaded Jan. 13, 2016, 1 page.
www.laserlightcomms.com, downloaded Jan. 13, 2016, 2 pages.
U.S. Office Action dated Feb. 8, 2017, in regards to U.S. Appl. No. 14/991,386, 57 pages.
U.S. Office Action dated Apr. 7, 2017, in regards to U.S. Appl. No. 14/991,394, 63 pages.
U.S. Notice of Allowance dated Apr. 10, 2017, in regards to U.S. Appl. No. 14/644,425, 10 pages.
U.S. Notice of Allowance dated Apr. 12, 2017, in regards to U.S. Appl. No. 14/817,985, 11 pages.
U.S. Notice of Allowance dated Jul. 5, 2017 from U.S. Appl. No. 14/817,985, 12 pages.
U.S. Final Office Action dated Sep. 19, 2017 for U.S. Appl. No. 14/991,394, 42 pages.
U.S. Final Office Action dated Aug. 1, 2017 from U.S. Appl. No. 14/991,386, 28 pages.
U.S. Non-Final Office Action dated Sep. 19, 2017 from U.S. Appl. No. 15/054,546, 22 pages.
U.S. Non-Final Office Action issued on Jan. 9, 2018 from U.S. Appl. No. 15/805,094, 8 pages.
U.S. Notice of Allowance dated Jan. 24, 2016 from U.S. Appl. No. 14/991,386, 21 pages.
U.S. Notice of Allowance dated Feb. 16, 2018 from U.S. Appl. No. 715/054,546, 5 pages.

* cited by examiner

LINK ARCHITECTURE AND SPACECRAFT TERMINAL FOR HIGH RATE DIRECT TO EARTH OPTICAL COMMUNICATIONS

CROSS-REFERENCE TO RELATED PATENT APPLICATIONS

This application claims priority, under 35 U.S.C. § 119(e), from U.S. Application No. 62/101,955, filed Jan. 9, 2015 and entitled "Network of Extremely High Burst Rate Optical Downlinks"; U.S. Application No. 62/101,975, filed Jan. 9, 2015 and entitled "Link Architecture and Spacecraft Terminal for High Rate Direct to Earth Optical Communications"; and U.S. Application No. 62/101,976, filed Jan. 9, 2015 and entitled "Ground Terminal Design for High Rate Direct to Earth Optical Communications." Each of the foregoing applications is incorporated herein by reference in its entirety.

This application is also related to U.S. application Ser. No. 14/991,394, filed on Jan. 8, 2016, and entitled "Network of Extremely High Burst Rate Optical Downlinks," and U.S. application Ser. No. 14/991,386 also filed on Jan. 8, 2016, and entitled "Ground Terminal Design for High Rate Direct to Earth Optical Communications," the contents of each of which is hereby incorporated by reference in its entirety.

GOVERNMENT SUPPORT

This invention was made with government support under Contract No. FA8721-05-C-0002 awarded by the U.S. Air Force. The government has certain rights in the invention.

BACKGROUND

Existing methods of delivering data from Earth-orbiting satellites to a ground stations fall into two general categories: sending radio transmissions to a fixed ground site via a relay satellite in geosynchronous Earth orbit (GEO) or sending radio transmissions directly to a ground site when the Earth-orbiting satellite passes over the ground site. Because of the long distances involved, and the paucity of GEO satellites, the geosynchronous relay approach is restricted in both availability and data rate. Likewise, because of the short connection time and restricted burst rates, the direct transmission is also restricted in its capability. In addition, Federal Communications Commission (FCC) regulations concerning RF spectrum allocation constrain the bandwidth available for satellite transmissions. As a consequence, data transfer to ground networks from Earth-orbiting satellites presents a significant bottleneck in the data collection capabilities of present-day Earth-orbiting satellite systems. This bottleneck is getting worse now that satellite missions are generating more data than existing RF systems can handle.

SUMMARY

Embodiments of the present invention include an apparatus for transmitting information from a spacecraft to an optical receiver via a free-space optical communications channel. In some examples, the apparatus comprises a plurality of optical transceivers, a wavelength-division multiplexer in optical communication with the optical transceivers, and a telescope in optical communication with the wavelength-division multiplexer. In operation, the optical transceivers generate a plurality of optical signals. The wavelength-division multiplexer forms a wavelength-division multiplexed (WDM) optical signal modulated at a rate of at least about 40 Gigabits per second (Gbps) from the optical signals. And the telescope transmits the WDM optical signal from the spacecraft to the optical receiver via the free-space optical communications channel.

In some cases, at least one of the optical transceivers is configured to generate an optical signal modulated at a data rate of at least about 100 Gbps. At least one optical transceiver may generate a coherently modulated optical signal.

The telescope may be configured to emit a beam with a divergence angle of about 15 μrad to about 1,500 μrad. In some cases, the telescope has an aperture with a diameter of about 0.1 cm to about 10 cm.

The apparatus may also comprise a sensor to acquire a beacon from the optical receiver; and a processor, operably coupled to the sensor, to determine a change in a pointing angle of the telescope based on the beacon. The processor can be operably coupled to the optical transceivers and configured to cause the optical transceivers to generate the optical signals in response to a trigger signal from the optical receiver.

The apparatus may also include a buffer operably coupled to the processor and the optical transceivers. In operation, the buffer stores data acquired by the spacecraft and drives the plurality of optical transceivers with the data at a rate of at least about 100 Gbps. The apparatus may further include an encoder, operably coupled to an input or output of the buffer, to encode data stored in the buffer with a forward error correction (FEC) code. The data may be read from the buffer at rate of 40 Gbps or higher to modulate the optical signals. In some cases, the data may be encoded with the FEC code before being read from the buffer.

The apparatus may still further include an optical amplifier, in optical communication with the WDM, to amplify the WDM optical signal to a power level of at least about 100 mW.

Yet another embodiment includes an apparatus for transmitting information from a spacecraft to an optical receiver via a free-space optical communications channel. The apparatus may comprise a buffer to store data encoded with an FEC code; a processor, operably coupled to the buffer, to read the data from the buffer at a rate of at least about 40 Gigabits per second (Gbps); a plurality of optical transceivers, operably coupled to the processor, to coherently modulate a plurality of optical signals with the data; a wavelength-division multiplexer, in optical communication with the plurality of optical transceivers, to form a wavelength-division multiplexed (WDM) optical signal from the plurality of optical signals; and a telescope, in optical communication with the wavelength-division multiplexer, to transmit the WDM optical signal from the spacecraft to the optical receiver via the free-space optical communications channel.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

DETAILED DESCRIPTION

Figure 1A:
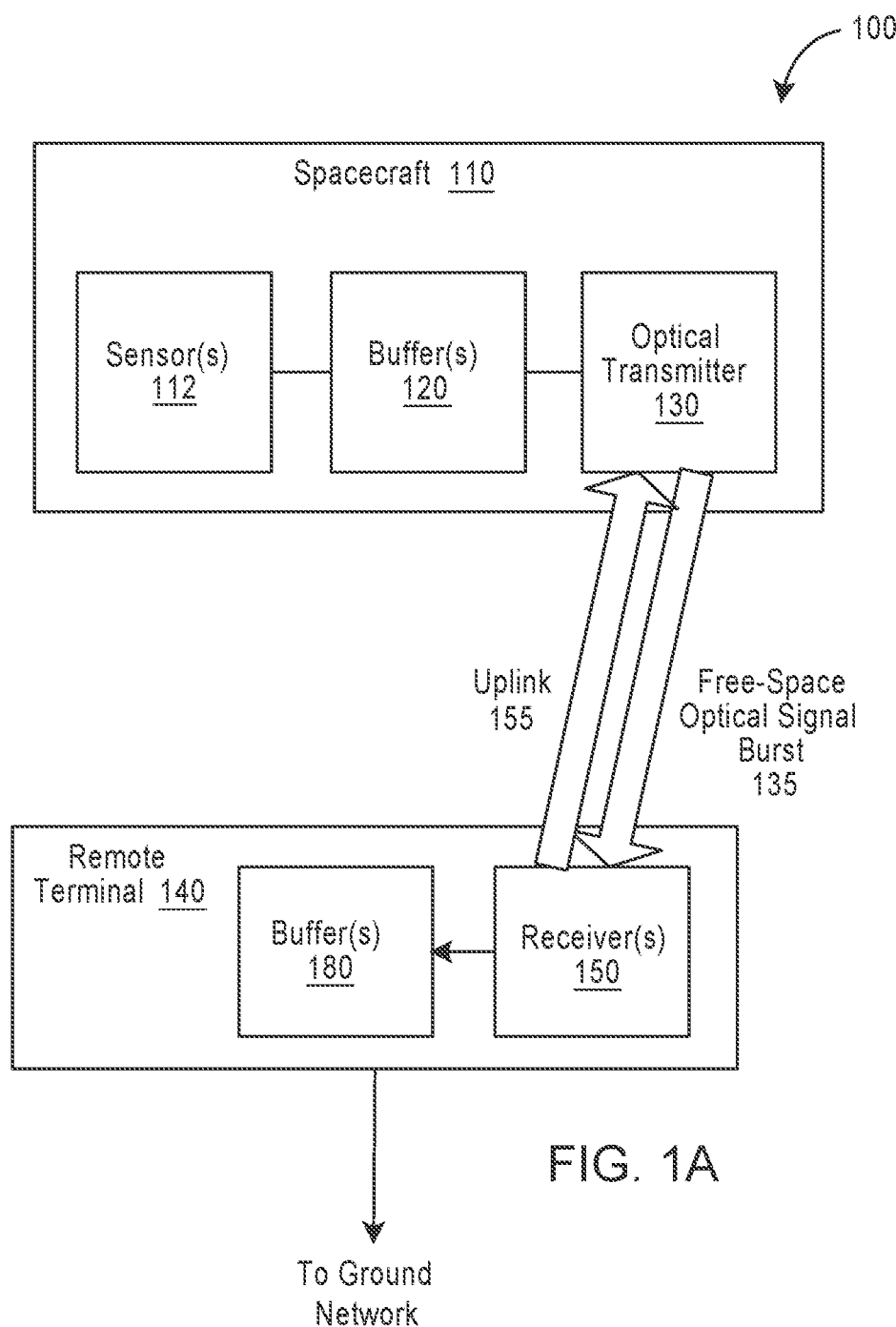
FIG. 1A is a block diagram of a free-space optical communications system that supports transmissions of bursts at data rates of 10 Gbps or more.

The direct downlink communications systems described herein leverage the extremely short wavelengths of optical telecom signals to achieve free space optical links that are only a few thousand kilometers long or less, and that deliver enough optical power (e.g., about 100 nW to a few µW) to support extremely high data rates with compact, low-cost satellite terminals and compact, low-cost remote terminals on the ground, in the air, or on other satellites. Such a system may include a satellite terminal that is small enough to be carried on a microsatellite (e.g., a 1 U-6 U cubesat) in low-Earth orbit (LEO) and have a mass of about 3 kilograms or less. Burst rates supported by these satellite terminals can be nearly any rate supportable in the fiber telecom market, for example, several hundreds of gigabits per second up to multiple terabits per second. Thus, these satellite terminals have direct downlink burst capabilities that can empty even very large storage buffers (e.g., 1 Tb, 10 Tb, 100 Tb, 1000 Tb, or more) in minutes. Furthermore, although traditional optical satellite communication systems are hindered by atmospheric obstacles such as clouds, which can block laser beams and/or cause excessive transmission delays, the extremely high burst rates of systems described herein can be used to transmit very large volumes of data under partly cloudy conditions, e.g., through the openings between clouds or other obscurations, such as leaves or dust.

Challenges of direct-to-Earth (DTE) laser communications (lasercom) can include short duration contact windows (e.g., less than ten minutes) during which a successful transmission can occur, long time gaps (e.g., tens of minutes to hours) between the transmission windows, limited on-board data storage, deleterious effects of atmospheric turbulence, especially at low elevation angles, and the inability to operate in cloudy weather. Direct-link optical communications systems described herein can have data rates that are high enough to empty the high-capacity on-board buffer(s) (e.g., having a capacity of at least about 1 Tb to hundreds of Tb) of a satellite in a single pass lasting only tens of seconds to a few minutes (e.g., 1-15 minutes).

In some embodiments, the median link latency does not exceed the buffer fill time for a given data acquisition rate. In other words, the buffer capacity and/or link latency may be selected so that the buffer is not be completely filled by sensor data between links. Overprovisioning the buffer capacity accounts for variations in the latency between links due to weather, etc.

In some embodiments, one or more distributed networks of compact optical ground terminals, connected via terrestrial data networks, receive data transmissions from a plurality of orbiting spacecraft (e.g., satellites). When a ground terminal site is obscured by clouds, an optical transmitter of the spacecraft sends buffered data to a next open/non-obscured ground terminal in the one or more distributed networks of compact optical ground terminals. Compact, low-cost space terminals described herein can be proliferated so as to increase the total number of interactions between the constellation of space terminals and the terrestrial data networks. Alternatively or in addition, inter-satellite crosslinks can be established within the communication system such that any single user (e.g., a satellite seeking to transmit data) can access an open terminal (e.g., a space terminal in orbit) at any time.

Direct-Link Optical Communications System

Turning now to the drawings, FIG. 1A is a block diagram of a direct-link optical communications system 100. The communications system 100 includes a spacecraft 110 (e.g., a satellite, such as a microsatellite, cubesat, etc.) in LEO or medium-Earth orbit (MEO) with one or more sensors 112 or other data-gathering devices that acquire data continuously, periodically, or aperiodically. One or more buffers 120 on the satellite store the data from the sensors for transmission by an optical transmitter 130 on the spacecraft 110 to a receiver 150 at a remote terminal 140 located on Earth. These transmissions may include one or more short bursts 135 (e.g., 10-second to 10-minute bursts) of data modulated at extremely high data rate (e.g., at least about 10 Gigabits per second (Gbps), at least about 40 Gbps, at least about 100 Gbps, at least about 200 Gbps, at least about 1 Terabit per second (Tbps), at least about 5 Tbps, or at least about 10 Tbps, depending on the application). The remote terminal 140, positioned at an altitude of less than about 100,000 feet (e.g., on the ground; on a building or structure, on a boat, buoy, or other ocean-based platform; or on an airplane, helicopter, unmanned aerial vehicle, balloon, or aircraft flying or hovering over the ground), receives the data at an average rate of at least about 10 Terabits (Tbits) per day, or at least about 100 Tbits per day. The remote terminal 140 includes one or more buffers 180 that store the data received from the optical transmitter 130 for transmission to one or more users via a communications network, such as the Internet.

These data transfer rates and volumes enable the satellite to generate and store data at a daily average rate of about 300 Mbps or at least about 1,200 Mbps, if not more. The remote terminal 140 stores the data in the one or more buffers 180 at an average rate of at least about 300 Mbps or at least about 1,200 Mbps and a burst rate of >10 Gbps. These average rates are computed over the span of a long enough period, such as an hour, several hours, a day, several days, or a week and could be higher depending on the modulation rates of the free-space optical communications signals, the number of ground stations and satellites, and the number of passes per day.

Figure 1B:
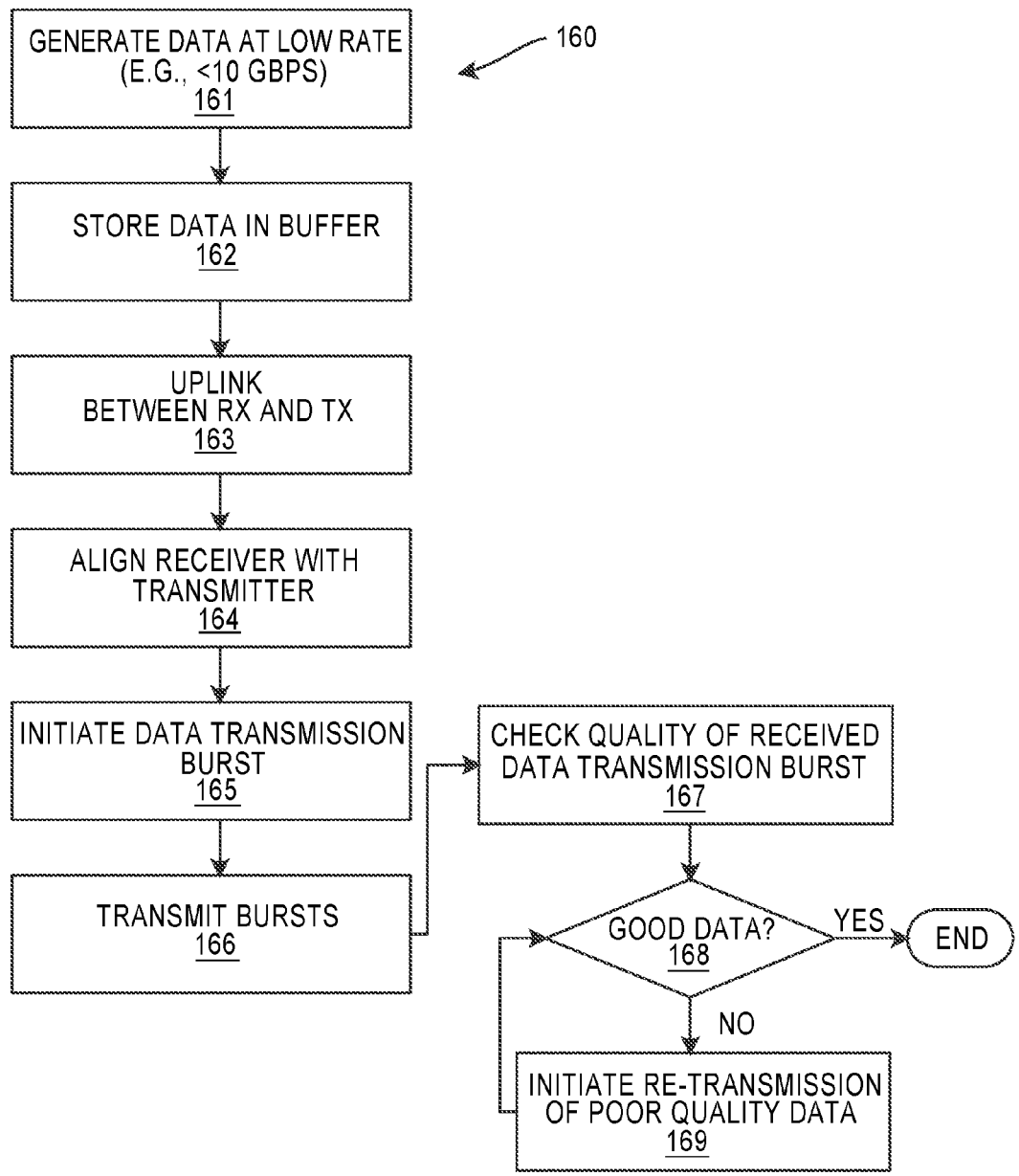
FIG. 1B is a flow diagram that illustrates free-space optical communications using the system shown in FIG. 1A.

FIG. 1B is a flow diagram that illustrates a free-space optical communications process 160 performed by the direct-link optical communications system 100 shown in FIG. 1A. During orbit and/or flight, the sensors 112 on the spacecraft 110 gather and/or create data and save the data in the onboard buffers 120 (box 161). For instance, the sensors 112 may include one or more imaging sensors, such as visible, infrared, or hyperspectral cameras, or any other suitable sensor, that generate Earth image data at a relatively low average rate (e.g., <10 Gbps, <1 Gbps, <100 Mbps, <10 Mbps, etc.). The sensors 112 may also include RF sensors like wide-band radars, synthetic aperture radars, etc. that sense objects or terrain on Earth. The sensors 112 may also generate scientific and/or telemetry data, including data about the spacecraft 110's flight path and electromagnetic events detected by the sensors 112.

The buffers 120 store the data for burst transmission by the optical transmitter 130 (box 162). In some cases, the data is encoded at a relatively low data rate (e.g., <10 Gbps, <1 Gbps, <100 Mbps, <10 Mbps, etc.) with a forward error correction (FEC) code before being stored in the buffers 120. In other cases, the data is encoded with a FEC at a high data rate upon being retrieved from the buffers 120 for transmission by the optical receiver 130.

FEC-encoded data comprises one or more code words. When data is transmitted through an atmospheric channel that has power fluctuations that last longer than the transmission time for multiple code words (e.g., for a code word transmission duration on the order of microseconds in duration and a power fluctuation that lasts milliseconds), an interleaver can be used to temporally interleave the symbols of many code words over a duration of about 1 second. With this approach, each code word sees a fairly uniform distribution of power fluctuations (as opposed to entire code words being erased as might occur without the interleaver) and approximately error-free performance can be achieved without large power margins to overcome the effects of the power fluctuations.

In some cases, however, it may not be possible or practical to utilize the FEC techniques described above in the lowest-layer codes. For example, a commercial transceiver may employ proprietary codes designed for a fiber transmission, which does not typically experience the power fluctuations seen in the free space channel. Or the additional latency and/or memory that would be used for a ~1-second (or greater) interleaver may be a problem. In such cases, errors that are not corrected by the lower-layer codes are compensated for at higher layers, for example, via erasure-correcting FEC codes (a form of FEC designed to specifically correct for erasures) and/or repeat-request protocols that request retransmission, via the uplink/beacon, of lost frames/segments.

In some cases, however, it may not be possible to utilize the FEC techniques described above in the lowest-layer codes. For example, a commercial transceiver may employ proprietary codes designed for a fiber transmission, which does not typically experience the power fluctuations seen in the free space channel. The receiver 150 initiates each transmission based on the spacecraft's trajectory, on-board data storage capacity, previous transmissions from the spacecraft 110, and projected timing of future transmission windows (passes) from the spacecraft 110. Based on this information, the receiver 150 communicates with the spacecraft 110 via a low-bandwidth (e.g., 10 kbps) RF or optical uplink 155 (box 163). The receiver 150 and the optical transmitter 130 align themselves with respect to each other, possibly using gimbals at the remote terminal 140 and the spacecraft 110 and/or body pointing by the spacecraft 110 (box 164). Alignment (or re-alignment) may occur continuously or as desired throughout the transmission process 160. Likewise, the spacecraft 110 and remote terminal 150 may communicate with each other via the uplink throughout the transmission process 160.

Once the receiver 150 and the optical transmitter 130 are properly aligned, the receiver 150 sends a control signal to the optical receiver 130 via the uplink 155 to initiate data transmission by the satellite 110 (box 165). In some cases, the receiver 150 detects or calculates when the spacecraft 110 reaches a predetermined angle above the horizon (for example, an angle below which operations are inefficient or below which the data volume that can be transferred during the pass is less than desired) as described below with respect to FIGS. 11A-C and starts the transmission accordingly. The receiver 150 may also time the transmission(s) to avoid clouds, atmospheric turbulence, etc. In other cases, the optical transmitter 130 may initiate transmission at a predetermined time (i.e., without an explicit signal from the ground terminal).

In response to receiving the control signal, the optical transmitter 130 transfers, at as high a rate as is possible for the particular space terminal/remote terminal pair and link conditions, as much of the data as possible in one or more free-space optical signal bursts 135 (box 166). A burst 135 may comprise at least about 1 Terabyte of information, be modulated at a rate of 210 Gbps (e.g., 40 Gbps, 100 Gbps, 1 Tbps, 10 Tbps, etc.), and/or last up to several minutes. As explained in greater detail below, the free-space optical signal burst 135 can include a plurality of wavelength-division multiplexed (WDM) signals. In operation, the receiver 150 demultiplexes the WDM signals in the free-space optical signal burst 135.

The short link delay of the downlink allows for several options for data flow and control, such as interleaving/forward error correction (FEC), simple repeats or erasure-correcting FEC, automatic repeat requests (ARQs), and/or delay/disruption tolerant networking (DTN). To control data flow, the receiver 150 checks the quality of the bursts 135 that it receives from the satellite, possibly using an FEC code (box 167), cyclic redundancy check (CRC), or other methods. Clouds, atmospheric fading, temperature gradients, misalignment, and other phenomena may degrade the signal quality, e.g., by attenuating or distorting a given burst 135. Severe enough attenuation or distortion may introduce bit errors at a frequency above the frequency at which the FEC can correct errors.

Several mechanisms exist for detecting bit errors in transmitted, FEC-encoded data. At lower layers of the protocol stack (e.g., the physical layer and/or the data link layer), errors in the received data may be detected and/or corrected by an FEC decoder. A cyclic redundancy check (CRC) code may also be appended to the data to facilitate detection of errors that the FEC code does not detect. In some implementations, frames/segments of data with uncorrectable errors are not delivered to higher layers, and instead are "erased." The higher layers may detect such omissions and use additional protocols for correction, such as erasure-correcting FEC codes and/or repeat-request protocols that request retransmission, via the uplink/beacon, of lost frames/segments. Erased frames/segments can be detected using a sequence counter that counts frames/segments and that increments with each transmitted frame/segment.

If the receiver 150 (or a processor coupled to the receiver 150) detects errors based on the received FEC (box 168), it may re-align itself with respect to the optical transmitter 130, boost its receiver gain (e.g., by increasing local oscillator power for coherent detection), and/or send a control signal to the satellite 110 via the uplink 155. The check for good data may occur on the time scale of a frame of data (e.g., microseconds), and individual frames of data may be retransmitted if errors are caused by, say, turbulence fluctuations.

The satellite 110 may respond to this control signal by re-transmitting some or all of the degraded data (box 169) to the receiver 150. Before re-transmitting the degraded data, the optical receiver 130 may re-align itself with respect to the receiver 150 and/or boost its signal power in order to increase the signal-to-noise ratio (SNR) at the receiver 150. It may also reduce the data transmission rate in response to the control signal.

In some embodiments (e.g., those with strong FEC), the check for good data may occur on a time scale of a link session. If a link session is determined to be bad (e.g., due to poor atmospheric conditions), the entire session may be repeated at the next link. Put differently, if the processor at the receiver 150 or remote terminal 140 determines that the received data is corrupt or degraded after the satellite 110 has passed from view, it may signal, to another remote terminal via the ground network, that the satellite should repeat the entire transmission during the link to the other remote terminal.

Data transmission proceeds when the optical receiver 150 has successfully received the last frames (or other structure) of data from the optical transmitter 130. The optical receiver 150 may send an acknowledgment signal to the optical transmitter 130 in response to receiving all of the data successfully. And if the optical transmitter 130 determines that it will not be able to re-transmit some or all of the degraded data while the satellite 110 remains in view of the remote terminal 140, it may instead continue to store the data in the buffer 120 for transmission at the next opportunity.

Even when the link connection duration is short, the extremely high burst rate facilitates the download of huge amounts of stored data. Furthermore, although clouds are often considered to be the Achilles heel of laser communication, the spacecraft 110, when orbiting in LEO, can traverse the sky in a few tens of minutes, and under partly cloudy conditions can quickly link up with the remote terminal 140 via spaces between the clouds, and burst—at extremely high data rates-very large amounts of stored data. For example, under clear (cloud-free) conditions and at a transmission data rate of 200 Gbps, a 10-minute pass of the spacecraft 110 can be sufficient for downloading up to 15 Terabytes of data, depending upon the size of the buffer(s) 120. By extension, the communications system 100 can accomplish the transfer of up to 1.5 Terabytes of data in a sky with only 10% clearings between the clouds.

The remote terminal 140 can store the received data from one or more passes of the spacecraft 110 (e.g., via the data bursts received during each of the one or more passes), and can forward it to a user either immediately or upon request. For example, a user may request a particular set of data, and the system 100 may retrieve it from the corresponding satellite via the next available remote terminal. The remote terminal then forwards the received data to the user via a terrestrial data network, such as the Internet. In applications where the terrestrial data network is not widely distributed, this system could be used to distribute content to local caches around the globe. These caches may be connected to the Internet and/or to local users via local-area networks (e.g., WiFi, Cellular, etc.).

Satellite-Based Free-Space Optical Communications Networks

Because the satellite is in LEO or MEO, and the link is relatively short, the optical transmitter 130 and the receiver 150 can be relatively small, light, and inexpensive. And because the receiver 150 can also be small, light, and/or inexpensive, the system 100 may include many receivers 150 distributed over a wide area (e.g., the continental United States) to increase the probability that the spacecraft 110 will be in view of one receiver 150 before the spacecraft's buffer fills up and either stops recording data or starts overwriting data. The receivers 150 may be located at fixed sites, mobile sites, aircraft, and/or even other spacecraft equipped with optical transmitters 130 for relaying data to Earth. In other words, communications systems 100 may include a network of space-based optical transmitters 130 and ground-based, airborne, and/or space-based optical receivers that can to establish space-to-ground (LEO-to-ground), space-to-air, or space-to-space (e.g., LEO-to-LEO or LEO-to-GEO) communications links.

The set-up and breakdown of these links can be coordinated with low-bandwidth optical and/or RF uplinks according to a predetermined data delivery protocol. In some instances, coordination and control of the space system (e.g., including the spacecraft 110 and, optionally, one or more further spacecraft) is performed using optical uplinks from one or more remote terminals, and/or via RF communications with the spacecraft 110 and the optical transmitter 130. For instance, control information (e.g., scheduling information, updated terminal location, software updates, etc.) may be delivered to the spacecraft 110 whenever the spacecraft 110 is in contact with a remote terminal 140, an RF terminal on the ground, or a space relay. Coordination and control of the ground system (e.g., including the one or more ground terminals 140 and, optionally, a network interconnecting the ground terminals 140) can be performed using ground connections and/or optically from the space network (e.g., for geographically isolated remote terminals 140). In other embodiments, the optical uplink is omitted.

Figure 1C:
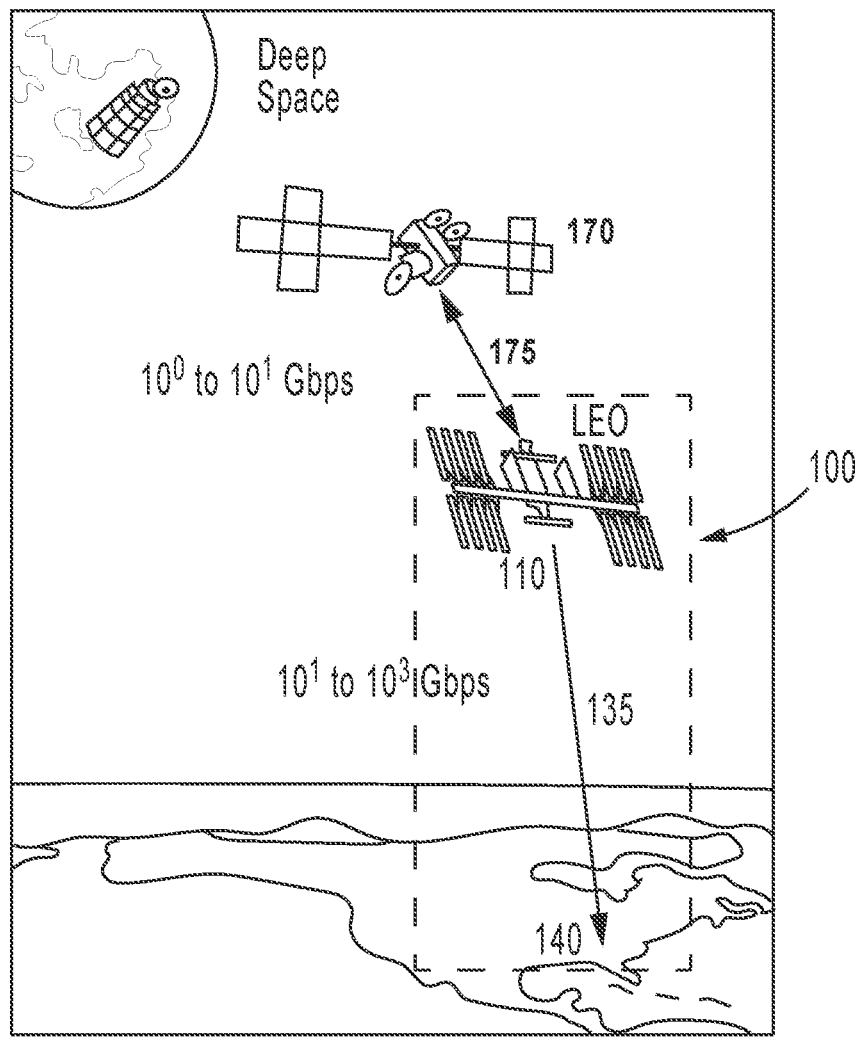
FIG. 1C is a rendering of an implementation of the communications system of FIG. 1A as part of a space-to-ground communication network.

FIG. 1C shows how the communications system 100 of FIG. 1A can be used to relay data from another satellite 170. The other satellite 170 and the LEO satellite 110 exchange data via relatively low-bandwidth (e.g., 1-10 Gbps) one-way or two-way communications link 175, possibly over minutes or hours. The LEO satellite 110 stores the data from the other satellite 170 in its on-board buffers 120. When the LEO satellite 110 is in view of a remote terminal 140 on Earth, it transmits the data to the remote terminal in a free-space optical signal burst 135 as described above and below.

System Components

Figure 2:
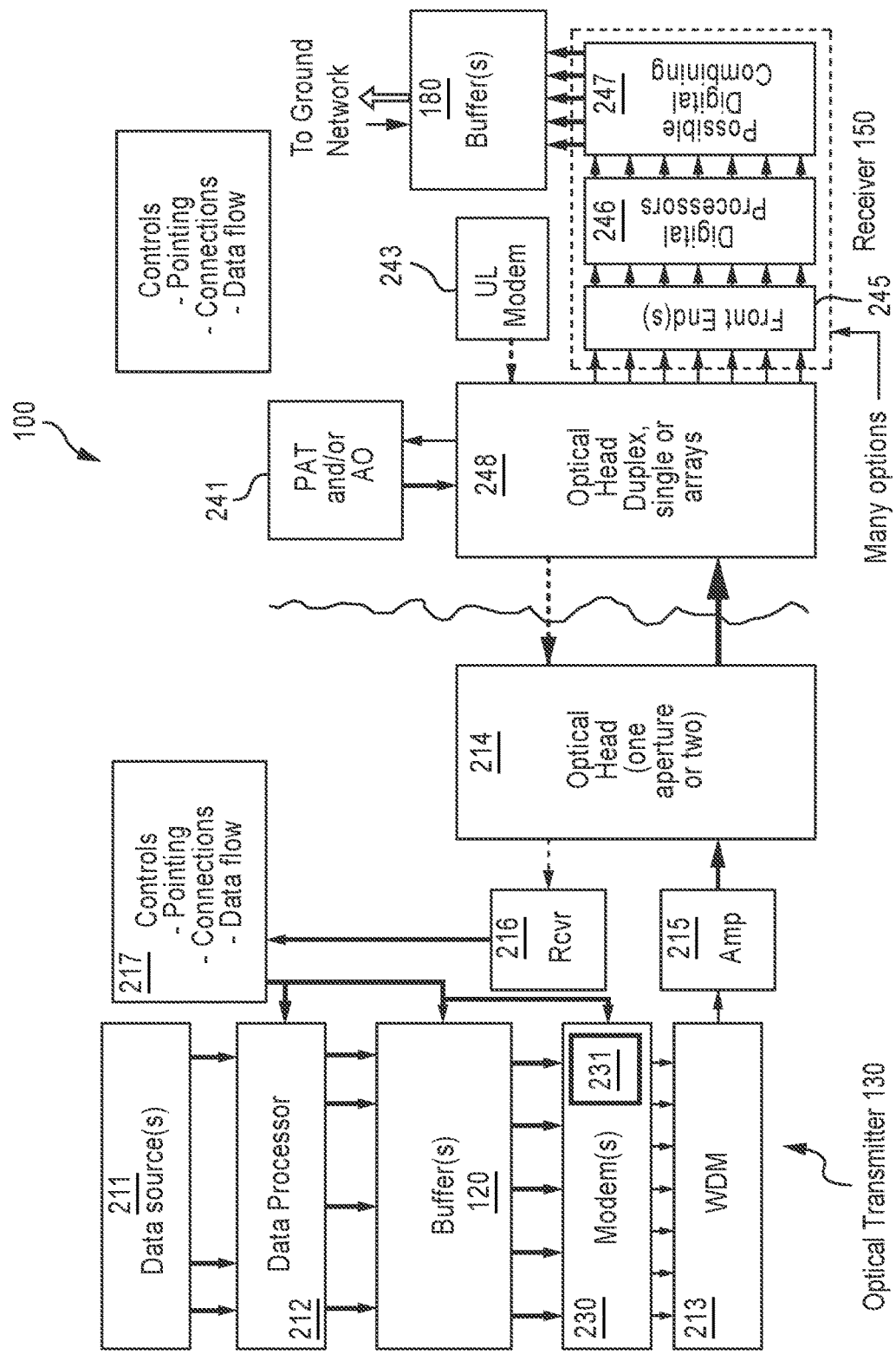
FIG. 2 is a block diagram showing components of space and ground segments of a direct downlink communications system.

FIG. 2 is a block diagram showing components of the high-data-rate downlink optical transmitter 130 and the optical receiver 150 of the direct downlink communications system 100. The direct downlink communications system 100 may connected to a ground network at the receiver 150 (e.g., via a buffer 180 on the receiver side).

An Example Optical Transmitter

The optical transmitter 130 can include one or more high-capacity buffers 120 and one or more modems 230. The high-capacity buffers 120 are configured to buffer data received at a first rate from one or more local data sources 211, including the sensors 112 shown in FIG. 1A, and are electrically coupled to the modems 230 to transfer the data to the modems 230 at a second rate that is higher than the first rate. The data may be pre-processed via a data processor 212 prior to receipt at the buffer(s) 120, for example, to insert error correction, request resending of erroneous bits, and/or to exert feed forward control by detecting and accounting for data errors. The data in the data sources 211 can include scientific, metrology, position, and/or other types of data, that is collected during a spacecraft mission and stored between readout sessions.

The modem(s) 230 can include power conditioning electronics (a power conditioning "subsystem"), a digital data formatter and encoder, and a high-speed modulator configured to perform high-speed amplitude and/or phase modulation (e.g., quadrature phase shift keying (QPSK), quadrature amplitude modulation (QAM), etc.), and one or more master laser transmitters 231 that emit light in the telecom C band (1530-1565 nm), for example, at 1550 nm. The outputs of the master laser transmitters 231 may be spaced in the spectral domain at integer multiples of about 50 GHz within this band. The modem(s) 230 receives buffered data from the buffer(s) 120, either via a serial channel or via parallel channels, and converts the buffered data into a plurality of modulated optical signals. In some implementations, the output speed of the buffer(s) 120 is matched to the modulator.

To achieve the highest possible data rates, the space terminal can further include a fiber or Arrayed-Waveguide-Grating (AWG) wavelength division multiplexer (WDM) 213 that is fed by multiple master laser transmitters 231 of the modem(s) 230, operating at different wavelengths. Other devices suitable for multiplexing the signals from the master laser transmitters 231 include, but are not limited to fused-taper fiber couplers, free-space dichroics, and other devices known in the art of fiber-optic communications. Optical signals received at the WDM 213 from the laser transmitters 231 are multiplexed by the WDM 213 into a single, multiplexed optical signal. The WDM 213 is optically coupled (e.g., via an optical fiber, such as a single-mode optical fiber) to an optical amplifier 215 (e.g., a semiconductor optical amplifier or fiber amplifier, such as a C-band fiber amplifier) that amplifies the multiplexed optical signal (e.g., to a level of at least about 100 mW to several watts, or at least about 500 mW to several watts) before it passes through an optical head 214. In some embodiments, the laser transmitter 231 is housed separately from the modem(s) 230 within the optical transmitter 130 of the communications system 100.

The optical head 214 can comprise an optics assembly and, optionally, a gimbal (e.g., a two-axis gimbal). The optics assembly of the optical head 214 can include one or more telescopes, including a downlink telescope and an uplink telescope, each having an aperture with a diameter of between about 1 cm and about 5 cm. (In some cases, the downlink and uplink may share an aperture, e.g., if a gimbal is used to point the aperture.) The telescope can be fiber-coupled to the downlink optical transmitter 130 via a fiber-optic connection to the output of amplifier 215 and configured to transmit a downlink beam/signal 235 toward an optical receiver 150. Some optical terminals described herein are configured to support lasercom link data rates of several hundred Gbps or higher, with a total mass of less than about 5 kg and a total power consumption of about 50 W or less. Depending upon the embodiment, the data rate can be about 10 Gbps or more, about 40 Gbps or more, 100 Gbps, 200 Gbps, 1 Tbps, 5 Tbps, or up to 10 Tbps.

The optical head 214 is also operably coupled to a relatively low data rate uplink receiver 216 (or "receiving detector") having a wide acquisition field-of-view (e.g., 1 milliradian to about 50 milliradians) and configured to receive an uplink beacon from an optical receiver (e.g., of a remote terminal). The uplink receiver 216 may be operably coupled to the downlink telescope of the optical head 214, or to a further telescope within the optical head that is dedicated to the receiver 216 and is co-aligned with the downlink telescope. The uplink receiver 216 has a field of view that is large enough to detect an uplink signal from the receiver 150 when the spacecraft 100 (and, optionally, a dedicated gimbal of the spacecraft) has pointed the optics of the optical transmitter 130 toward the uplink source. (Note that there could also be a separate uplink data receiver, in addition to the acquisition receiver.)

When the uplink receiver 216 detects the uplink, it waits for a modulation (e.g., pulsed) which carries a unique identifier for the ground station. In some embodiments, the uplink signal carries an encrypted message containing an identifier of the optical receiver 150. If the optical transmitter 130 determines (e.g., based on contents of the uplink signal) that the detected uplink is an expected one, the optical transmitter 130's pointing can be fine-tuned so that the optical head 214 is pointed toward the optical receiver 150, at which time the optical transmitter 130 sends the downlink beam/signal. The uplink receiver 216 continues to monitor the uplink signal for pointing corrections and/or for link and data-flow control messages. Such messages could support, for instance, control of the optical transmitter 130 pointing via motions of the downlink beam that the optical receiver 150 detects as power variations.

There are a couple of specific cases of closed-loop point-ahead correction that could be considered. In one case, the spacecraft varies its pointing in a predetermined way and the receiver sends back information to correct a pointing bias based on its observations of the resulting power fluctuations. In another case, the receiver may command the spacecraft to adjust its pointing slightly in a particular direction. Then, based on its measurement of the impact of that motion on the measured received power, the receiver could command further adjustments.

The optical receiver 216 is operably coupled to a controller 217 ("control module" or "control electronics," for example, including one or more microprocessors). The optical receiver 216 sends uplink data received from the optical receiver 150 via the optical head 214 to the controller 217. The controller 217 is configured to control spacecraft and/or telescope pointing, connections to telemetry, and/or downlink data flow, and can be configured to monitor the "health" of optical components of the optical transmitter 130, the modem(s) 230, etc. For example, the modems 230, etc., may provide low-rate interfaces for monitoring their temperature, indications of faults in the receipt or transmission of data, etc.

The controller 217 can have command and/or telemetry connections with a spacecraft bus. The controller 217 can include a memory that stores positions of existing terminals (e.g., other space terminals and/or remote/ground terminals), its own position and attitude (e.g., over time), and/or a clock for synchronizing operations with the ground segment 240. The controller 217 can control the acquisition and uplink communication detector (i.e., optical receiver 216) and demodulate, validate, interpret, and/or act upon the uplinks. The controller 217 may also oversee the starting and stopping of the downlink data flow based on clocks, terminal angles, and/or requests from the optical receiver 150.

Steering of the optical transmitter 130 is performed by the two-axis gimbal optionally included within the optical head 214, and/or through body steering of the spacecraft itself, for example, if the spacecraft is a microsatellite, or with a small, fast-steering mirror. The spacecraft and/or the optical transmitter 130 can include one or more attitude sensors configured to measure the attitude of the optical transmitter 130.

In some embodiments, the optical transmitter is configured to optically crosslink high-speed data to other spacecraft (e.g., to other satellites within a constellation of satellites). Such optical transmitters can include any or all of the components described above with regard to the optical transmitter 130 of FIG. 2, but may include larger telescopes and/or larger power amplifiers. Additionally, such optical transmitters may send buffered data over crosslinks at a lower data rate than on a downlink because of larger diffraction losses and smaller receive telescopes on the spacecraft with which the crosslink is established. However, cross-linkable optical transmitters may not require as full a set of data-handling protocols because of the all-vacuum nature of cross-links (e.g., there is no atmospheric fading due to turbulence or clouds).

In some embodiments, the optical transmitter 130 of the communications system 200 includes the optical head 214, the uplink acquisition and low-data-rate optical receiver 216, a high-data-rate optical transmitter with fast readout, and a control and spacecraft-interface function 217.

In some embodiments, the optical transmitter 130 includes one or more opto-mechanical components, such as an opto-mechanical scanner. Since a LEO link can be established at a very high data rate with a relatively small spacecraft aperture (e.g., a few centimeters or less), the opto-mechanical systems for the space terminal can be much simpler than those developed for larger apertures (>10 cm). While one could simply scale a more complex design to a smaller aperture, doing so would be unnecessarily expensive.

The performance of the optical link between the optical transmitter 130 and the optical receiver 150 ("link performance") can vary due to: (1) range variations as the spacecraft passes over the optical receiver 150, and/or (2) fading at the optical receiver 150 due to atmospheric turbulence, space terminal motion, clouds, etc., resulting in power fluctuations at the optical receiver 150. The optical receiver 150 can detect these power changes, for example by monitoring power and/or error performance, and can send corrections or repeat-requests to the optical transmitter 130 via the uplink using relatively low-rate signaling.

An Example Receiver

As shown in FIG. 2, the receiver 150 can include an optical head 248 communicatively coupled to a pointing, acquisition and tracking (PAT) module and/or an adaptive optics (AO) module 241 running one or more AO algorithms. The optical head 248 includes a compact telescope (or multiple telescopes, for example in an array) with a downlink aperture diameter of about 10 cm to about 100 cm (e.g., 20 cm, 30 cm, 40 cm, 50 cm, 60 cm, etc.) and a demultiplexer. (Larger telescope diameters, e.g., for even higher-capacity links, are also contemplated.) The telescope can be mounted on a two-axis gimbal for pointing anywhere in the sky and for deployment almost anywhere on Earth. The compact design of the gimbal-mounted telescope allows for the telescope to be stationed on rooftops, car roofs, etc. In some embodiments, the telescope is mobile. Downlink signals received by the telescope of the optical head 248 are demultiplexed into a plurality of optical signals that are passed to an optical receiver 250, including one or more front ends 245 to convert the optical signals into digital signals for further processing at one or more digital processors 246 and, optionally, digital combining at 247. For instances, the signals may be combined using channel-wise aperture combining and coherent demodulation as shown in FIG. 9 of concurrently filed U.S. application Ser. No. 14/991,386, which is incorporated herein by reference in its entirety. The processed digital signals are then passed to one or more buffers 180 for storage and/or for communication to a user via a ground network.

The optical head 248 is optically coupled to an uplink (UL) modem 243 which transmits uplink signals to be sent to one or more space terminals 210. Low-power (e.g., about 0.1 W to about several Watts) uplink transmissions can be sent from the optical receiver 150 via a downlink aperture of the telescope of the optical head 248 (i.e., a "shared" aperture), or via a small, dedicated, uplink-only telescope/aperture. The uplink optical power and aperture may be selected such that it is below levels of concern for local eye safety and/or the Federal Aviation Administration (FAA). The optical receiver 150 may be configured to send an uplink transmission toward a selected/predetermined optical transmitter 130 at a selected/predetermined time so as to alert the optical transmitter 130 that a link is desired.

The uplink transmission beam may be sufficiently wide to remove, reduce or mitigate as many pointing uncertainties as possible. Alternatively, the uplink transmission beam may be a narrow beam that is scanned across the uncertainty region.

The uplink is modulated by the UL modem 243, and can carry identification and/or validation signals, as discussed above. Shortly (e.g., seconds) after transmission of the uplink from the optical receiver 150, the downlink telescope of the optical head 248 may detect a returned beam, spatially acquire and lock up with the returned beam, and subsequently acquire, demodulate, decode, and otherwise process the downlink data via the receiver 250. The processed data is stored in one or more local buffers 180.

The optical receiver 150 also includes a controller 242 ("controls module" or "control electronics," for example, including one or more microprocessors) to control uplink telescope and/or receiver pointing, connections to telemetry, uplink data flow and/or downlink data flow. The controller 242 of the optical receiver 150 can be configured to: (1) oversee the AO algorithm; (2) calculate and implement the pointing of the gimbal based on knowledge or an estimate (e.g., position, orbit, trajectory, velocity, etc.) of the optical transmitter 130; (3) calculate and create data transmission protocol signals; (4) coordinate activities of the integrated optical receiver 150; and/or (5) communicate with users and the ground data infrastructure.

A ground terminal 240 can include a GPS receiver or other means for determining its location, and may also include a star field tracker for determining its attitude. The optical receiver 150 can include a memory that stores information about the satellites it can communicate with, along with their present ephemeris and orbital parameters.

A ground terminal 240 can include a mechanical, electro-optic, or electronic turbulence mitigation system, which may use a small amount of the downlink power for its operation. The amount of the downlink power used by the turbulence mitigation system can depend upon the brightness of the received transmission from the space terminal and/or the duration of the link formed between the ground terminal 240 and the space terminal. Optical components of the optical receiver 150 can also include a weather protection subsystem, for example comprising one or more apertures that are opened and closed depending upon weather measurements from dedicated monitors.

As mentioned above, the receiver 150 may be disposed at a ground terminal, on a boat, on a spacecraft, or on an airplane. Space-borne receivers are positioned farthest from atmospheric turbulence, and so coupling from even a large space telescope into a fiber can be relatively straightforward.

However, far-field scintillation on the downlink can cause dropouts, and so multiple receive apertures, spaced apart from one another, can be used in space, in order to combat scintillation. That is, turbulence in the atmosphere causes the power in the downlink beam to have some spatial distribution. A single small aperture might be located in a (temporary) null of the far field power distribution and, thus, experience a fade. With multiple spatially separated small apertures, it becomes less likely that all apertures will be simultaneously located in nulls in the far field power distribution. So the total power collected by multiple apertures tends to fluctuate less than the power collected by one small aperture. Note that "small" in this discussion refers to the aperture size relative to the spatial coherence length of the atmosphere, which is typically about 1-20 cm.

Similar fading mitigation tradeoffs also exist when comparing systems that employ feed-forward, feedback, and modified optics designs. Ground terminals and other remote terminals can also include one or more receive apertures, depending upon the design.

Multi-Channel Space and Remote Terminal Architectures

Figure 3A:
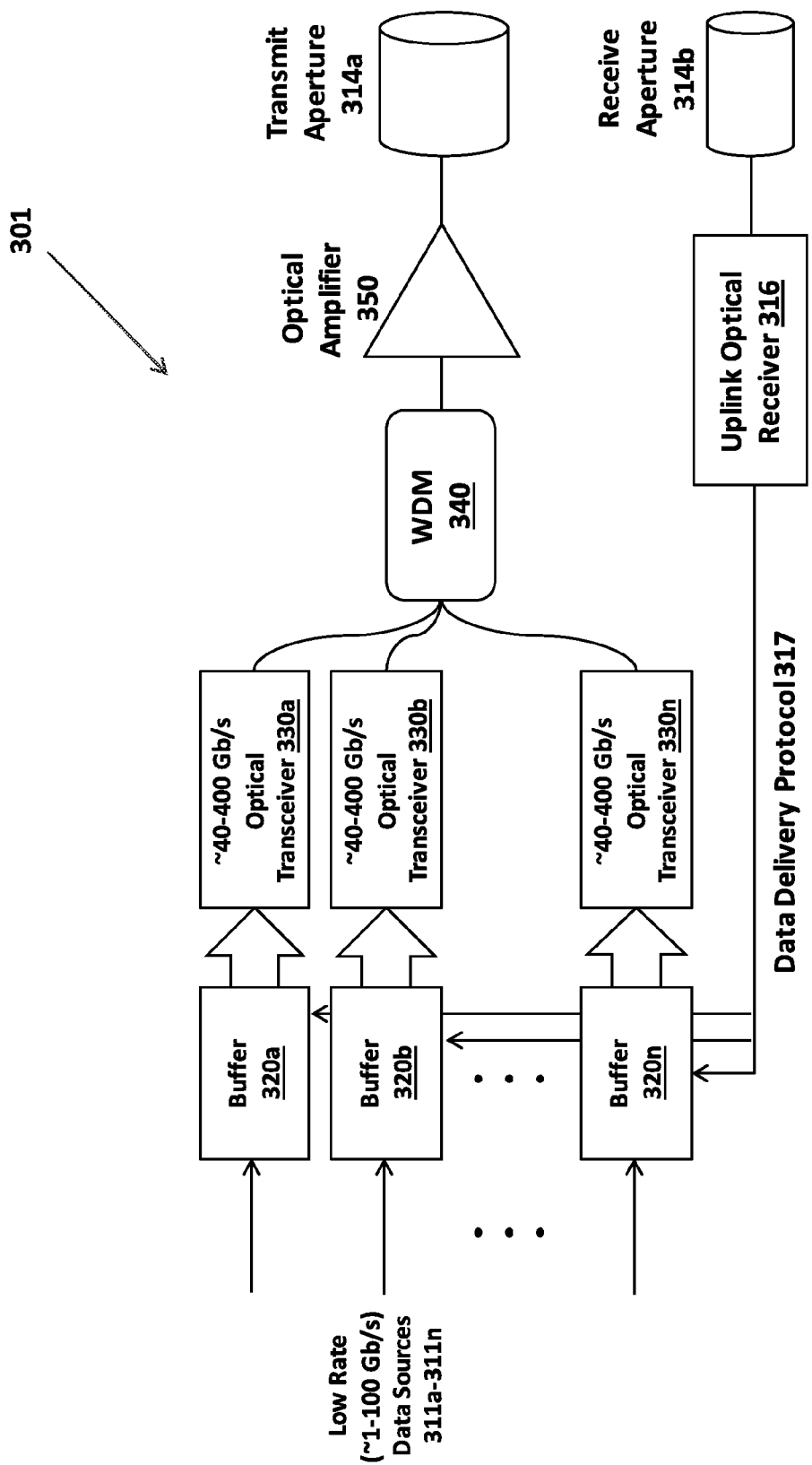
FIG. 3A shows a space terminal with many optical transceivers fed by respective buffers to generate a high-rate wavelength-division multiplexed (WDM) free-space optical signal.
Figure 3B:
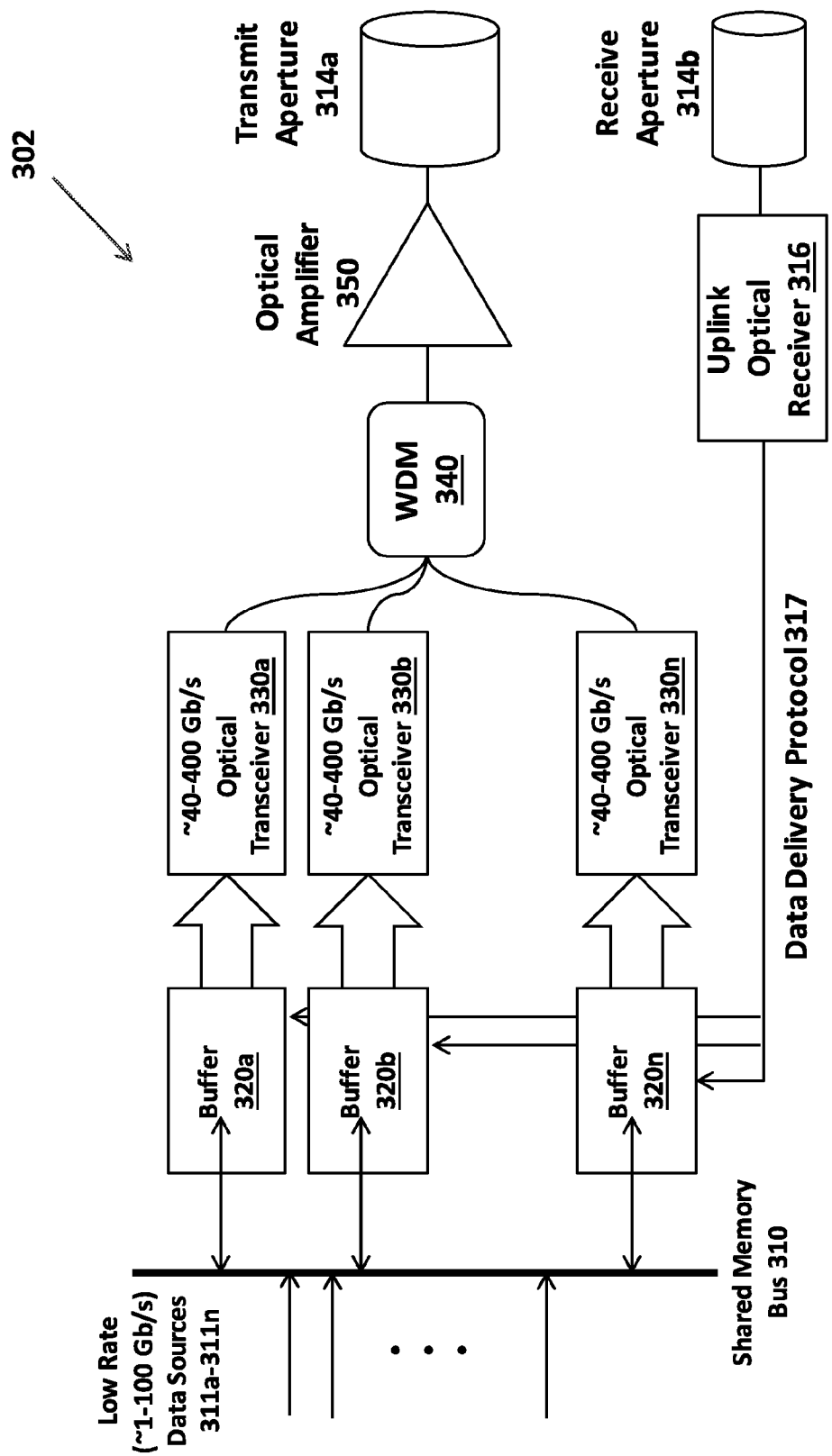
FIG. 3B shows a space terminal with many optical transceivers fed by respective buffers coupled to a shared memory bus.
Figure 3C:
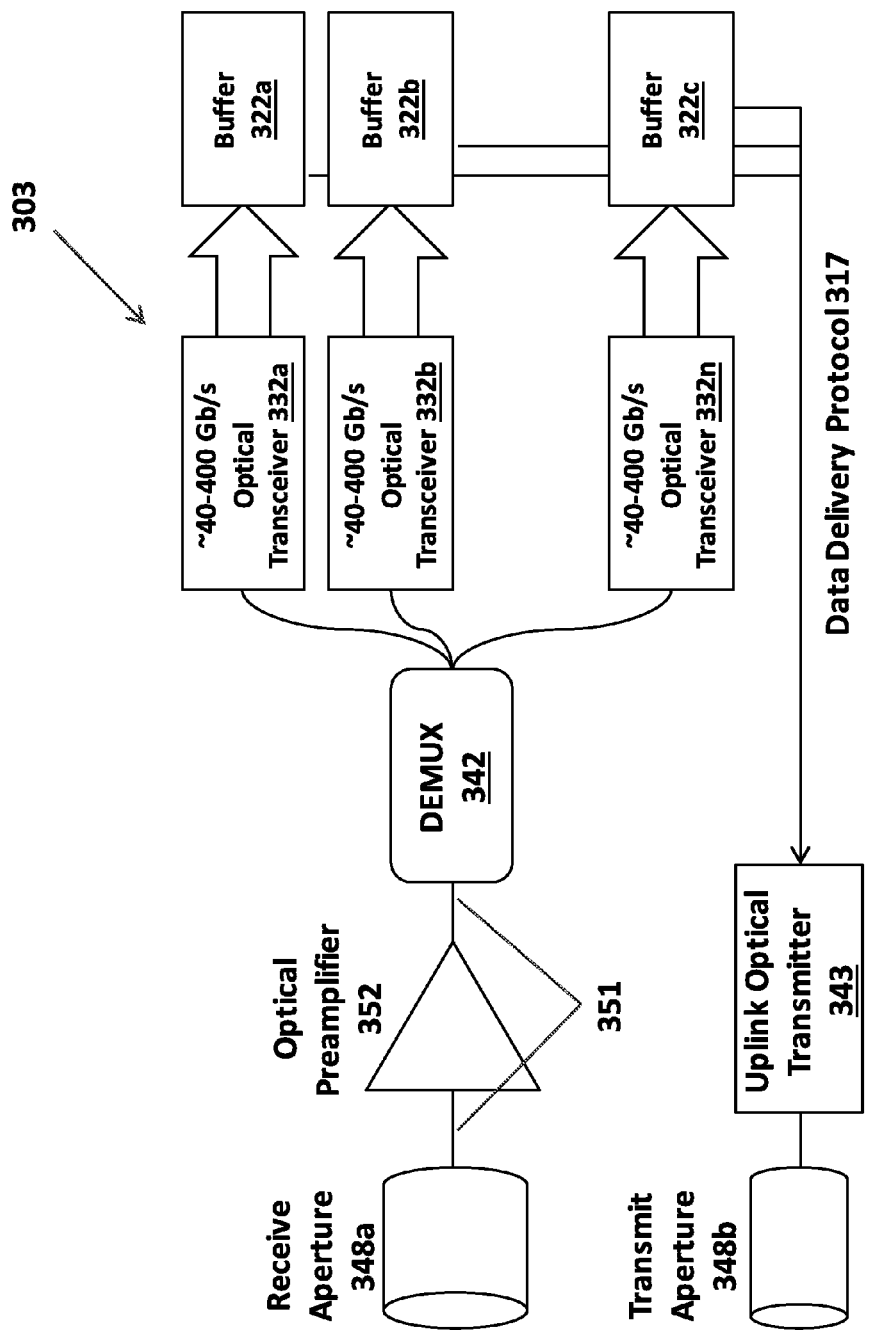
FIG. 3C shows a ground terminal suitable for receiving, de-multiplexing, and buffering WDM free-space optical signals from the space terminals shown in FIGS. 3A and 3B.

FIGS. 3A-3C show multi-channel space terminal (optical transmitter) and remote terminal (optical receiver) architectures suitable for transmitting a WDM burst transmission via free space. Each channel in the multi-channel architecture includes its own space-side and remote-side buffers and can operate independently of the other channels. As a result, each channel can be commanded to provide and/or process data independently of the other channels using a downlink data protocol.

FIG. 3A shows an optical transmitter and associated components, collectively called a space terminal 301, configured to send broadband, WDM signals from a satellite or other spacecraft in LEO or medium-Earth orbit (MEO) to a ground station or other remote terminal (not shown). The space terminal 301 includes several buffers 320a-320n (collectively, buffers 320, each of which may store 100 GB to 100 TB) whose inputs are coupled to respective data sources 311a-311n (collectively, data sources 311) on or in the satellite and whose outputs are coupled to respective optical transceivers 330a-330n (collectively, optical transceivers 330). The buffers 320 also have control inputs coupled to an uplink optical receiver 316, which in turn is coupled to a receive aperture (telescope) 314b and controls data transmission using a data delivery protocol 317.

The outputs of the optical transceivers 330 are coupled via one or more respective waveguides (e.g., optical fibers) to a WDM 340, which in turn is coupled via another waveguide to an optical amplifier 350, such as a doped fiber amplifier (e.g., a Erbium, Ytterbium, or Thulium-doped fiber amplifier), tapered amplifier, or semiconductor optical amplifier. The transceivers 330, WDM 340, and/or optical amplifier 350 can be discrete components coupled together via optical fibers or other waveguides. They can also be integrated into or on a single substrate and coupled together with waveguides formed in or on the substrate. In some configurations, each transceiver 330 output is amplified by a corresponding optical amplifier (in which case the post-WDM optical amplifier 350 may not be present) such that the amplified transceiver outputs are combined by the WDM.

Each buffer 320/optical transceiver 330 pair forms part of an independent WDM channel for generating and transmitting data to the remote terminal. In operation, each data source 311 generates data at a relatively low rate (e.g., 1 Gbps to 100 Gbps) and sends that data to a corresponding buffer 320, which stores the data for transmission to the remote terminal, which may be disposed on the ground, in the air, or on another spacecraft. The remote terminal may trigger the transmission by sending an appropriate telemetry or control signal to the uplink optical receiver 316 via the receive aperture 314b. The space terminal 301 may also initiate the transmission autonomously based on previously received telemetry or scheduling information. One or more processors in the uplink optical receiver 316 processes the telemetry or control signal to determine the data transmission parameters (data to send, transmission start time, burst length, power level, etc.). The uplink optical receiver 316 then queries or commands the buffers 320 to provide the requested data to the optical transceivers 330 according to the data delivery protocol 317.

The data delivery protocol 317 can include confirmation of data and/or requests for repeated transmission of data not received. The data delivery protocol 317 may command the buffers to empty their contents in response to data not being successfully received at the receiver. In other implementations, the buffers are organized (e.g., in files) and their data are prioritized, in advance of and/or during a link, for transmission by the data delivery protocol 317. In some embodiments, a separate control channel (which may be optical or RF and may not necessarily be operating at the same time as the downlink) is used to determine which data to send, schedule transmissions, set power levels, etc.

Each optical transceiver 330 uses the data that it receives from its corresponding buffer 320 to modulate a laser beam at a rate of 40-400 Gbps, e.g., using quadrature phase shift keying (QPSK), quadrature amplitude modulation (QAM), or another suitable modulation technique. Each optical transceiver 330 operates at a slightly different wavelength (e.g., spread over 1530-1565 nm at 50 GHz spacing), so the optical transceivers' coherently modulated outputs can be multiplexed together by a WDM 340 to form a WDM signal beam with a data rate of hundreds to thousands of Gigabits per second. This WDM signal beam may comprise one or more bursts of data, each of which lasts for seconds to minutes (e.g., 10 seconds to 10 minutes), depending in part on the data being transmitted, the fidelity of data received at the remote station, and the duration of the spacecraft's pass within view of the remote station.

The optical amplifier 350 amplifies the WDM signal beam to a power level of at least about 100 mW to several Watts. An optical fiber or other waveguide couples the amplified WDM signal beam to a telescope and/or other beam-shaping optics, shown in FIG. 3A as a transmit aperture 314a. In other embodiments, the amplifier 350 is free-space coupled to the telescope and/or other beam-shaping optics, for example, to reduce losses associated with coupling to a waveguide (e.g., for a large-mode semiconductor optical amplifier).

The telescope emits a free-space WDM signal beam with a divergence angle of about 15 μrad to about 1,500 μrad, about 30 μrad to about 1 mrad, or about 60 μrad through an aperture whose diameter is about 0.1 cm to about 10 cm, or about 1 mm to about 5 cm, or about 2 cm to about 5 cm—in some embodiments, small enough to fit on a cubesat. The free-space WDM signal beam propagates to the remote terminal, which receives, demultiplexes, demodulates, and processes the free-space WDM signal beam to recover the data generated by the data sources 311 and stored in the buffers 320.

If the receiver or processor at the remote terminal determines that the received data is degraded, corrupt, incomplete, or unintelligible, it may transmit a repeat request, according to the data delivery protocol 317, thereby instructing the space terminal 301 to transmit the degraded, corrupt, incomplete, or unintelligible data again. The space terminal 301 receives the repeat request via the receive aperture 314b and the uplink optical receiver 316. In response to receiving the repeat request, the uplink optical receiver 316 commands the corresponding buffer(s) 320 and optical transceiver(s) 330 to repeat transmission of some or all of the requested data. In particular, the uplink may instruct the streaming downlink to go back a fixed number of frames or files and repeat transmission according to the data delivery protocol 317. The uplink may also instruct the streaming downlink to go back a variable number of frames and repeat transmission. And the uplink may instruct the memory (buffers 320) which particular frames to repeat.

Because the WDM channels operate independently, a given buffer 320 and optical transceiver 330 can respond to a repeat request while other buffers 320 and optical transceivers 330 continue to transmit data to the remote terminal or respond to other repeat requests. Thus, the data delivery protocol 317 and uplink ensure reliable data delivery of downlink data for each WDM channel.

FIG. 3B shows a space terminal 302 with the components described above with respect to FIG. 3A and a shared memory bus 310 coupled to the data sources 311 and buffers 320. In operation, the data sources 311 and buffers 320 exchange data via the shared memory bus 310 to accommodate different link conditions and to provide greater redundancy. For example, if atmospheric fading, range loss, or other link conditions support operation of only a subset of the WDM channels, the buffers 320 in the unused WDM channels may transmit requested data to buffers 320 in the operating WDM channels for transmission to the remote terminal. Likewise, if a particular buffer 320 or optical transceiver 330 malfunctions, the data destined for transmission via that WDM channel may be transferred to another buffer 320 for transmission by a properly functioning WDM channel. The data sharing via the shared memory bus 315 may be controlled by a higher-level terminal controller, or via a decentralized architecture in which the buffers coordinate among themselves to determine how data is to be shared. For example, if one buffer is supporting a transceiver that is active on a given pass, that buffer could signal to the other buffers to transmit high priority data over the shared bus.

Data sharing via the shared memory bus 310 can also be used to increase data throughput from a single buffer 320 at the expense of throughput from other buffers 320. Suppose that buffer 320a stores more data than can be transmitted in a single pass given its transceiver modulation rate, etc., but that a user at the remote terminal nevertheless wants to retrieve all of the data in buffer 320a. Buffer 320a may distribute a portion of its data to buffers 320b-320n for transmission via other WDM channels in order to transmit all of the data in a single pass. Likewise, the shared memory bus 310 may route data among buffers 320 in response to a repeat request if the buffer 320 storing the data to be repeated is still transmitting data.

FIG. 3C shows a receiver and associated components, collectively called a remote terminal or ground terminal 303, suitable for receiving, de-multiplexing, and buffering WDM free-space optical signals from the space terminals shown in FIGS. 3A and 3B. The ground terminal 303 includes a telescope and/or other beam-shaping optics, labeled as a receive aperture 348a in FIG. 3C, that couple the free-space optical signals into a single-mode waveguide 351, such as a single-mode optical fiber. The single-mode waveguide 351 is coupled to an optical preamplifier 352, which in turn is coupled to a wavelength-division demultiplexer 342. The demultiplexer 342 is coupled to a set of optical transceivers 332a-332n (collectively, optical transceivers 332), each of which is wired to a corresponding buffer 322a-322n (collectively, buffers 322). The buffers 322 are coupled to an optical uplink transmitter 343, which transmits free-space uplink signals to the space terminal via a transmit aperture 348b.

Single-Buffer Space and Remote Terminal Architecture

Figure 4A:
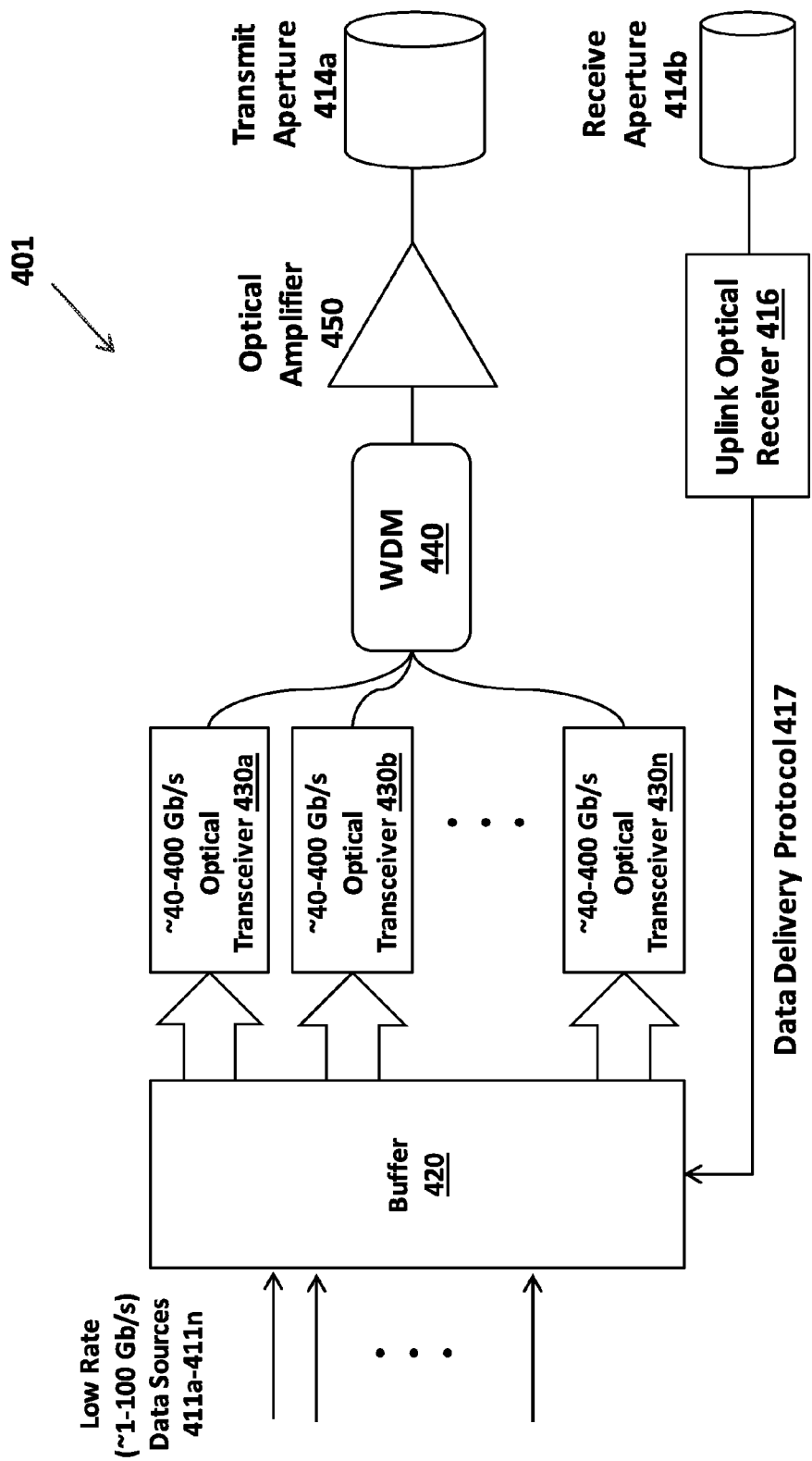
FIG. 4A shows a space terminal with many optical transceivers fed by a shared buffer to generate a high-rate wavelength-division multiplexed (WDM) free-space optical signal.
Figure 4B:
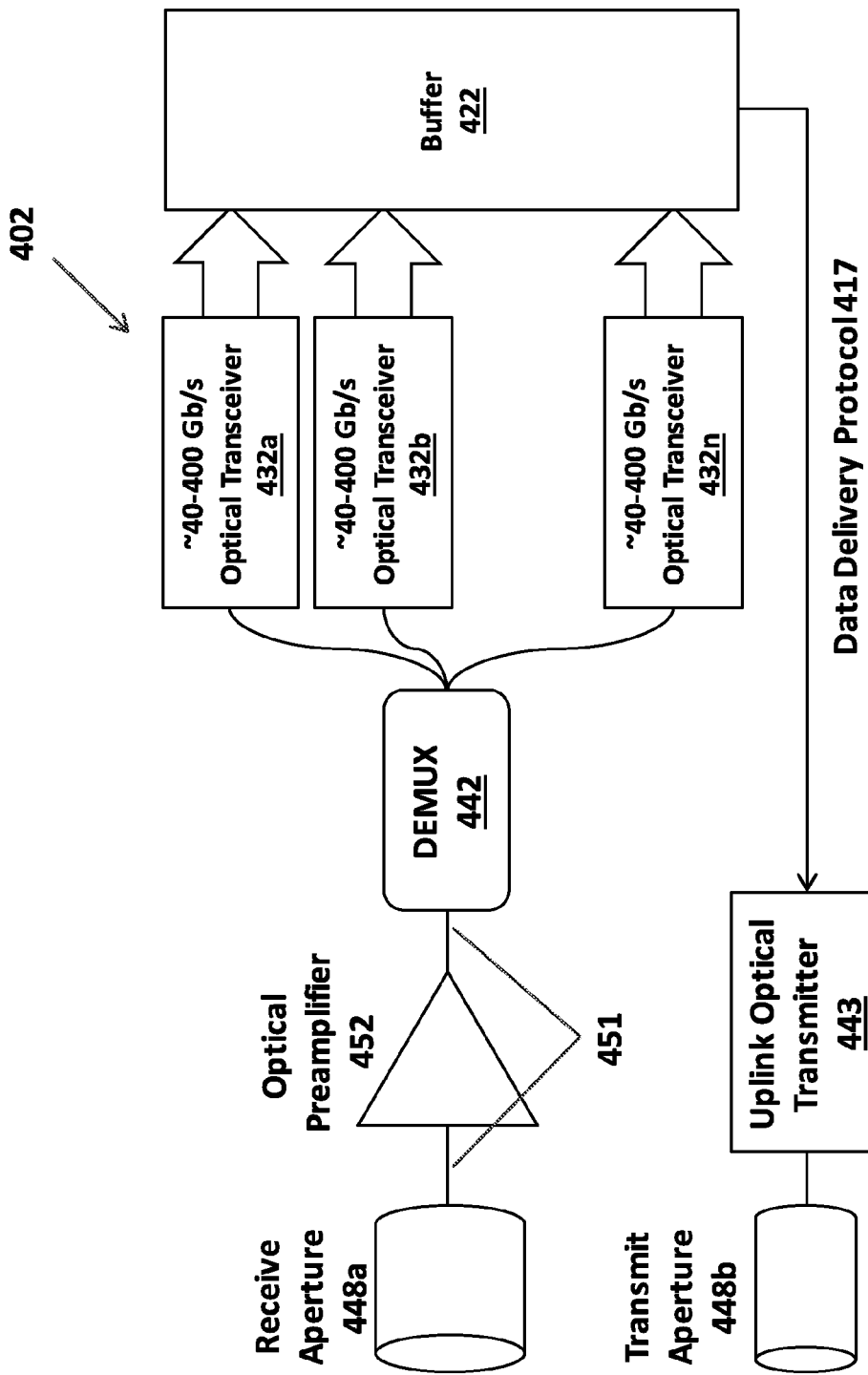
FIG. 4B shows a ground terminal suitable for receiving, de-multiplexing, and buffering WDM free-space optical signals from the space terminal shown in FIG. 4A.

FIGS. 4A and 4B illustrate a single-buffer architecture for a space terminal 401 and a remote terminal 402 on the ground, in the air, or on another spacecraft. As readily appreciated by one of skill in the art, a single-buffer space terminal can be used to transmit data to a multiple-buffer remote terminal, and a multiple-buffer space terminal can be used to transmit data to a single-buffer remote terminal.

As shown in FIG. 4A, in the single-buffer architecture, data sources 411a-411n (collectively, data sources 411) on or in the spacecraft feed a single high-capacity buffer 420 instead of multiple buffers. The high-capacity buffer 420 is sized to meet mission specifications for data generation rates and data delivery rates over the communications link. For a LEO application, buffer sizes of 10's to 100's of Tb per 100 Gbps channel can be used. The buffer may be a parallel implementation of commercial buffer technologies (e.g., SATA3, PCIe, etc.) to achieve the desired burst rates. The buffer 420 provides data to multiple optical transceivers 430a-430n (collectively, optical transceivers 430) simultaneously to generate modulated signals in different WDM channels. In other words, the WDM channels share the buffer 420. To accomplish this, the buffer 420 may read different disk sectors to different transceivers 430, or the buffer 420 may feed the transceivers 430 with interleaved data. The buffer may alternate between these two approaches, depending upon mission constraints. By sending data to the transceivers 430 in parallel, the bandwidth of the uplink channel can be reduced, since a single response can be sent back to the buffer to indicate the quality of the data across all channels (e.g., having similar channel conditions), rather than a response from each individual channel.

A WDM 440 coupled to the optical transceivers 430 multiplexes the coherently modulated signals to form a WDM signal beam that is coupled via a single-mode waveguide to an optical amplifier 450 whose output is coupled to a transmit aperture (telescope) 414a. The space terminal 401 also includes a receive aperture 414b coupled to an uplink optical receiver 416 that controls data readout from the buffer 420 according to a data delivery protocol 417. The data delivery protocol 417 ensures reliable data delivery of downlink across all WDM channels and reduces the uplink bandwidth.

FIG. 4B shows a single-buffer ground terminal 402, which is compatible with the multi-buffer space terminals shown in FIGS. 3A and 3B, that can receive, de-multiplex, de-modulate, and buffer WDM free-space optical signals from the space terminal 401 shown in FIG. 4A. The ground terminal 402 includes a telescope and/or other beam-shaping optics, labeled as a receive aperture 448a in FIG. 4B, that couple the free-space optical signals from the space terminal 401 into a single-mode waveguide 451, such as a single-mode fiber. The single-mode waveguide 451 is coupled to an optical preamplifier 452, which in turn is coupled to a wavelength-division demultiplexer 442. The demultiplexer 442 is coupled to a set of optical transceivers 432a-432n (collectively, optical transceivers 432), all of which provide data to a single buffer 422. The buffer 422 is coupled to an optical uplink transmitter 443, which transmits free-space uplink signals to the space terminal via a transmit aperture 448b according to the data delivery protocol 417. The buffer 422 is also accessible via a ground/terrestrial network such that end-users can access the data, for example by transferring files from the buffer.

Processes for Free-Space Optical Communications

Figure 5:
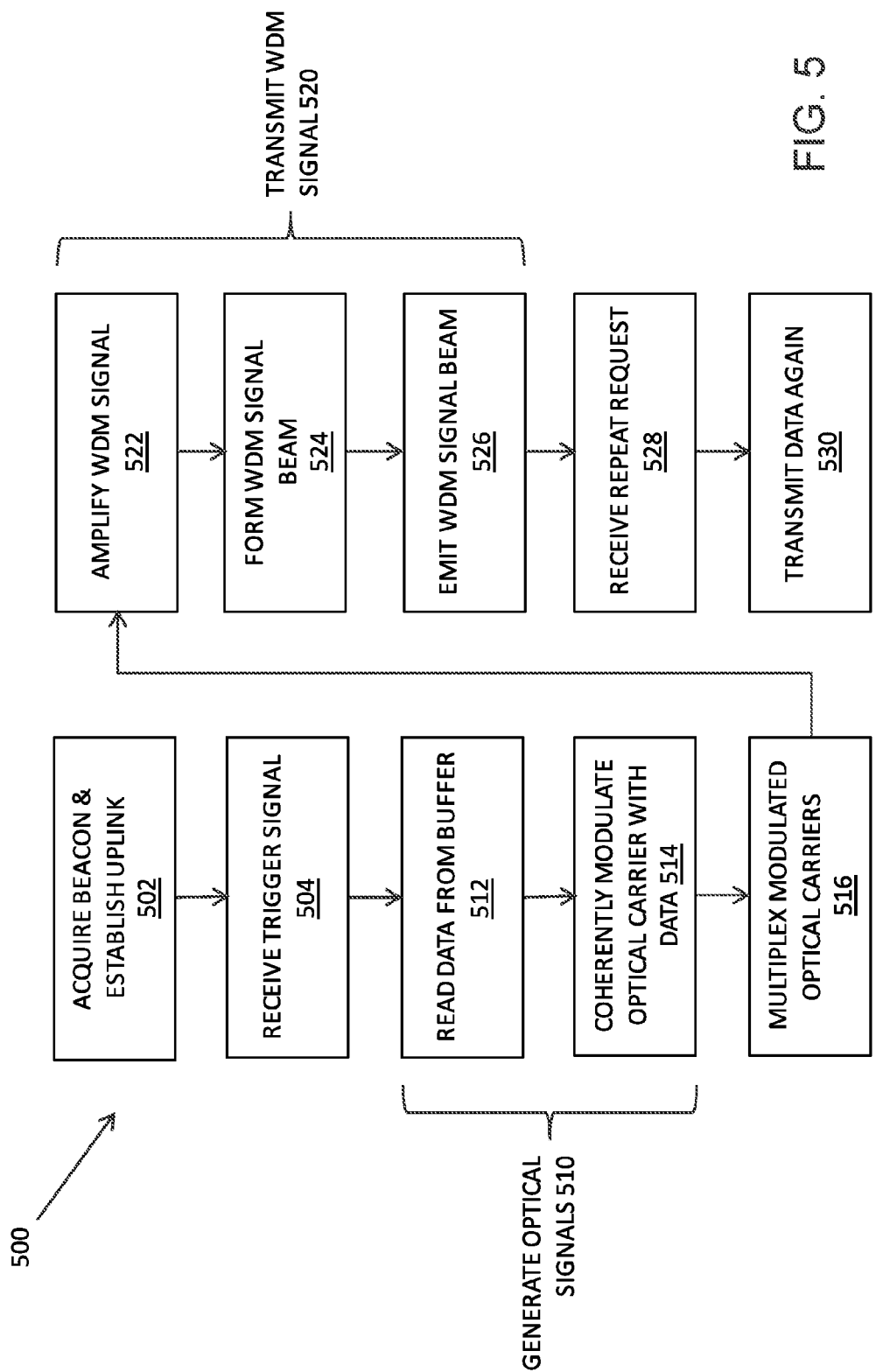
FIG. 5 illustrates a process for generating and transmitting a free-space WDM signal from a spacecraft to a remote terminal (e.g., a ground terminal).

FIG. 5 illustrates a process 500 for transmitting data from an optical transmitter or space terminal to a receiver at a ground terminal or other remote terminal. First, the space terminal acquires a beacon emitted by the ground terminal (502). Next, the ground terminal (e.g., ground terminal 303 or 402) establishes an uplink communications channel with a space terminal (e.g., space terminal 301, 302, or 401) using an RF beacon, optical uplink transmitter, or some combination of optical and RF signaling. Once the uplink is established and the apertures on the space and ground terminals are aligned with each other, the ground terminal may transmit a trigger signal to the space terminal (504) that causes the space terminal to transmit one or more high-bandwidth, free-space WDM signals to the ground terminal. In other implementations, however, the space terminal initiates transmissions, for example, according to a schedule.

The space terminal generates the optical signals (510) in response to the trigger signal. In the multi-buffer architecture, the space terminal reads data from multiple buffers in series, parallel, or both; in the single-buffer architecture, the space terminal reads data from the single buffer (512). In either case, the optical transceivers coherently modulate respective optical carriers (514) with the data read from the buffer(s). The coherently modulated signals, each of which is on a different carrier, are multiplexed together using a WDM coupled to the transceivers (516).

Next, the space terminal transmits the multiplexed WDM signals to the receiver (520). An amplifier boosts the signal strength (522), and a telescope or other beam-shaping optics form the amplified, multiplexed WDM signals into a free-space beam with a divergence angle of about 30 µrad to about 1 mrad (e.g., about 60 µrad) (524) that is emitted via an aperture with a diameter of less than about 6 cm (526), for example, between about 1 mm and about 5 cm for beam widths at a wavelength of about 1550 nm.

A receive aperture at the ground terminal couples at least a portion of the free-space beam into the single-mode waveguide, which guides the multiplexed WDM signals of the free-space beam to the optical pre-amplifier. The optical pre-amplifier boosts the signal strength before the WDM signals are de-multiplexed by a de-multiplexer and coupled to corresponding optical transceivers, which coherently demodulate the data from the optical carriers. The buffer(s) coupled to the optical transceivers store the demodulated data for further processing, analysis, and/or transmission via other communications networks (e.g., the Internet).

A processor may monitor the quality of the data received by the buffer(s). In some cases, the processor checks the fidelity of the data based on a forward error correction (FEC) code, bit error rate (BER), or even the strength of the received signal. In the multi-buffer architecture, the processor may monitor the WDM channels independently of each other and issue repeat requests for each WDM channel independently. If the processor detects that the data fidelity is unacceptable (e.g., if the BER is below a predetermined threshold or if there is an error in a given block of bits), for example, based on an output of an FEC decoder and/or other data check, such as a CRC or a monitored sequence counter in the data frames, then the processor may issue a repeat request to the space terminal via the uplink optical transmitter and/or via an RF communications channel. The satellite terminal receives the repeat request (528) and transmits the requested data to the ground terminal again (530).

Forward Error Correction for Free-Space Optical Communications

Figure 6A:
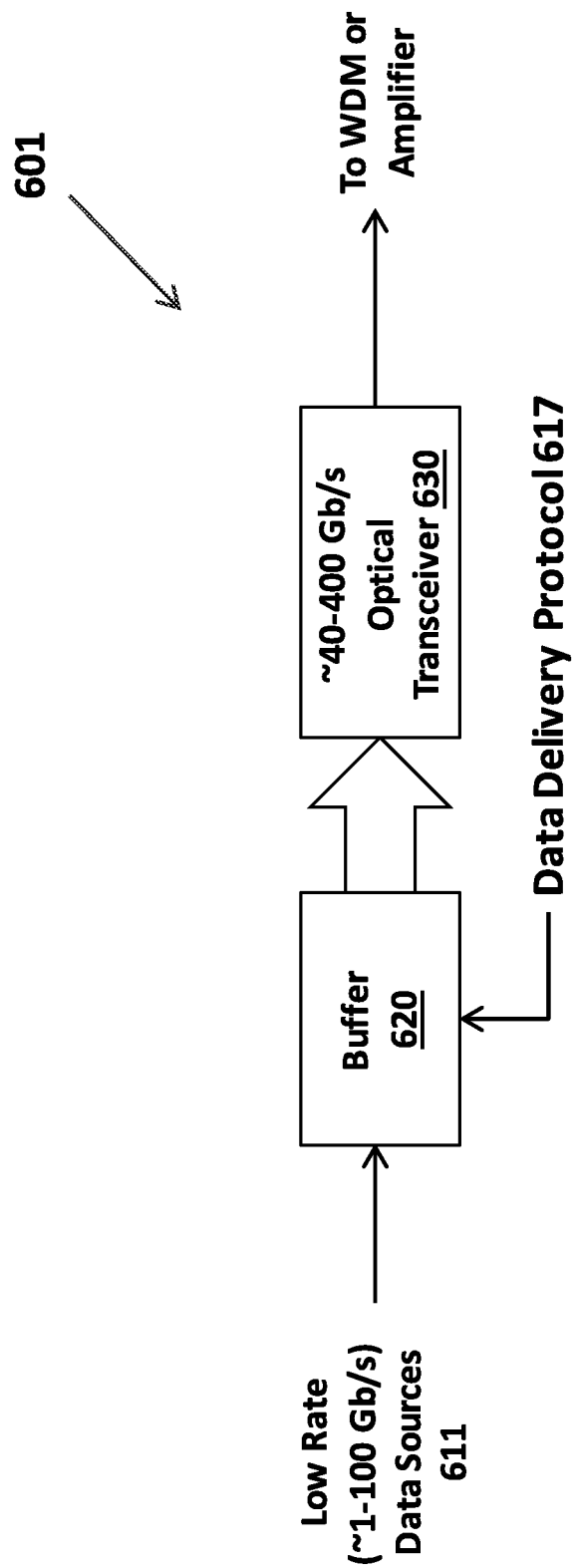
FIG. 6A illustrates error correction by repeat transmissions of degraded data.
Figure 6B:
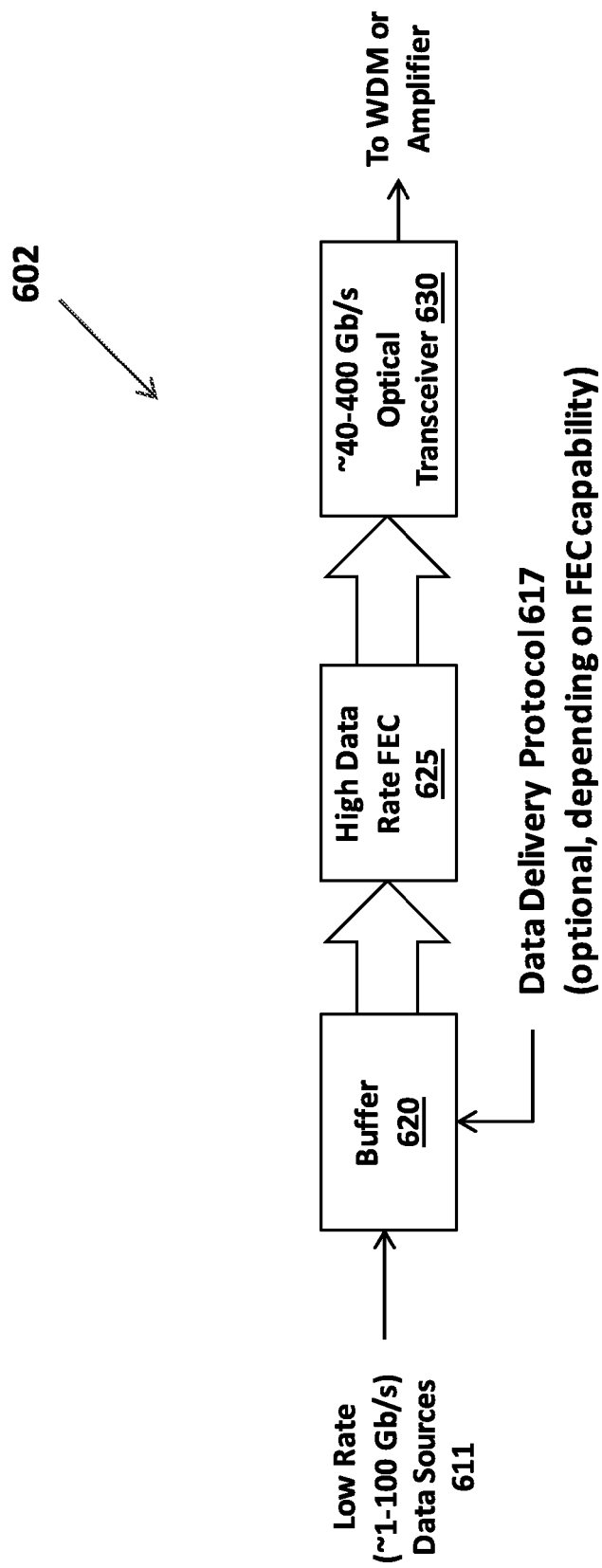
FIG. 6B illustrates FEC using a high-rate FEC encoder to encode data from a buffer with a FEC before modulation at an optical transceiver.
Figure 6C:
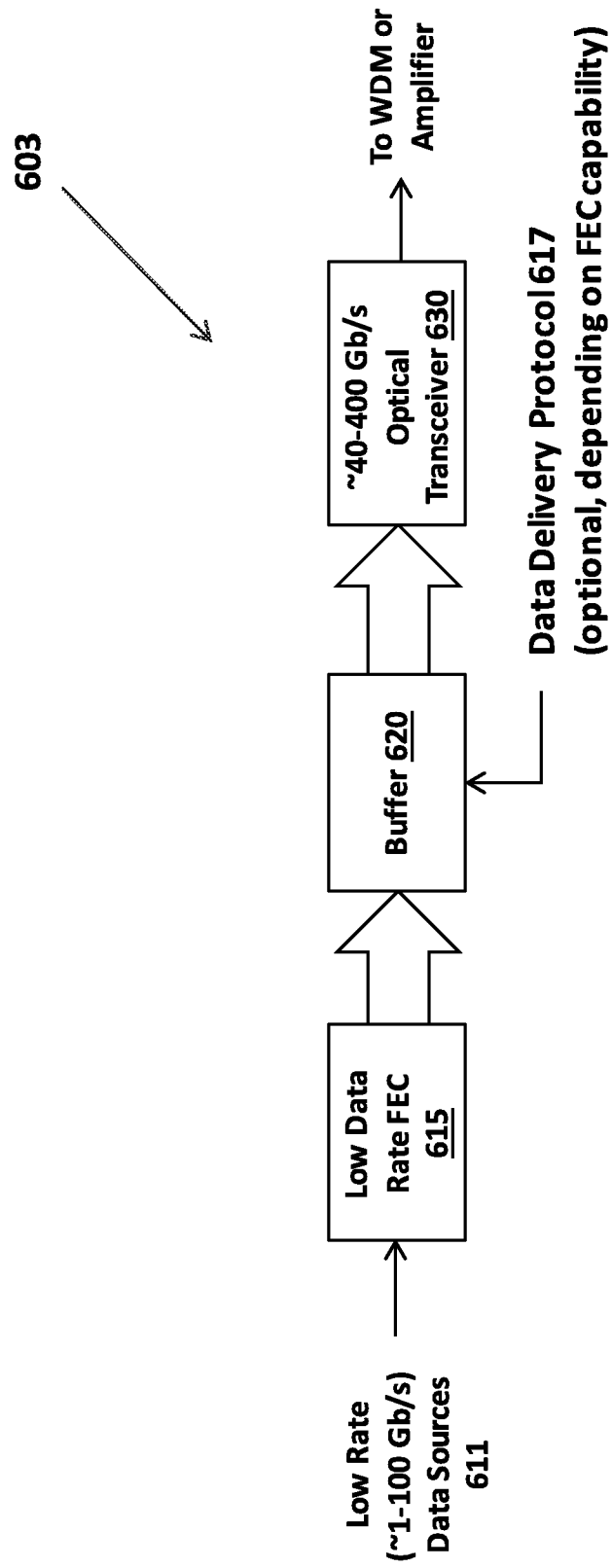
FIG. 6C illustrates FEC using a low-rate FEC encoder to encode data before the data is stored in a buffer.

FIGS. 6A-6C illustrate different techniques for performing error correction on high-bandwidth, free-space optical signals transmitted from a spacecraft to a ground terminal or other remote terminal. In the configuration 601 of FIG. 6A, a buffer 620 receives and stores data from one or more low-rate (e.g., an average rate of 10 Mbps to 100 Gbps, which is very low compared to the >1 Tbps transmission burst rate) data sources 611, such as a sensor on the spacecraft. The buffer 620 provides the data to a high-speed (e.g., 40-400 Gbps) optical transceiver 630, which modulates the data onto an optical carrier for transmission to a ground terminal. If the ground terminal does not receive the expected data or detects an error in a given block of data, based on one or more of: FEC, CRC, and a frame sequence count, it transmits a repeat request to the space terminal, which transmits the data again according to a data delivery protocol 617.

The configuration 602 of FIG. 6B illustrates FEC using a high-rate (e.g., 40-400 Gbps) FEC encoder 625 that encodes data from the buffer 620 with an FEC, such as a block code or a convolutional code, before the optical transceiver 630 modulates the data onto the optical carrier. The ground terminal uses the code to check and correct for errors. As above, if the ground terminal does not receive the expected data or detects an error in a given block of data, it transmits a repeat request to the space terminal, which transmits the data again according to a data delivery protocol 617. In some cases, however, the FEC is strong enough to correct most or all of the errors in the received data, thereby reducing or eliminating the need for repeat requests. Alternatively or in addition, the FEC encoder may reside within the optical transceiver 630.

The configuration 603 of FIG. 6C illustrates FEC using a low-rate (e.g., 1-100 Gbps) FEC encoder 615 to encode data before the data is stored in a buffer 620. Put differently, the low-rate FEC encoder 615 applies the FEC to the data from data sources 611 as the data is written to the buffer 620 at low data rates. In this case, the FEC can correct for both errors that accumulate while data is stored in buffer 620 (e.g., from radiation events) and errors from the optical channel. Also, using the low-rate FEC encoder 615 eliminates the latency associated with applying an FEC on-demand before transmission.

The low-rate FEC encoder 615 may consume lower peak power than the high-rate FEC encoder 625 (FIG. 6B), which may reduce peak power consumption. Again, if the ground terminal does not receive the expected data or detects an error in a given block of data, it transmits a repeat request to the space terminal, which transmits the data again according to a data delivery protocol 617. And again, the data delivery protocol 617 may not be needed if the FEC is strong enough to ensure reliable data delivery via the free-space optical channel. In some cases, erasure codes (another type of FEC) are also used to deal with frame erasures that occur when the physical layer FEC is insufficient. Common erasure codes include "Reed Solomon Codes," "Fountain Codes," "Raptor Codes," etc.

FEC of optical signals offers several advantages. First, the code rate can be lower, potentially simplifying other aspects of the link architecture. For traditional RF channels, spectral constraints and the desire for maximizing data rate within those constraints often leads to the use of high rate codes (e.g., code/information rates of about 0.75-1, corresponding to the ratio of information bits to coded channel bits). By contrast, in optical channels, spectral efficiency is less of a concern (for example since there are no regulations for use of the optical spectrum), and as such, low rate codes (e.g., about 0.75 or less) can be used. This can be very beneficial, especially when used in conjunction with a long interleaver, in mitigating the effects of atmospheric-turbulence-induced power fading at the receiver.

Second, low rate codes can correct for more errors than the higher rate codes. As a result, the receiver can operate at lower powers, even in the presence of power fading. Once the code has been designed to operate in this environment, the additional errors that may be introduced by, for example, memory upsets after long-term storage in a radiation environment, can be negligible. Put differently, encoding the data prior to storage in the buffers 120 makes it possible to correct for errors caused by the radiation effects on the buffers 120 and the atmospheric fading in the free-space communications channel with a single code. As such, applying the code prior to writing to the memory (where the memory bandwidth and capacity are sufficient to store the data with the bandwidth expansion due to the code) can correct for radiation-induced memory errors.

Codes that are suitable for the optical channel include serial- and parallel-concatenated turbo codes (with encoders that are straightforward to implement at very high data rates), low-density parity-check codes (LDPC), and concatenations of these codes with other more traditional codes, such as BCH codes. For example, the Digital Video Broadcasting—Satellite—Second Generation (DVB-S2) standard uses an LDPC code concatenated with a BCH code. For optical channels, these codes can be used in conjunction with a block or convolutional interleaver that interleaves a plurality of code words, which tend to be short in duration compared to the power fade durations, prior to transmission so that an individual code word sees a good statistical sample of the various fades on the channel (as opposed to being entirely erased by a single fade, in which case there is no hope of being able to recover the data).

Other suitable codes include erasure end-to-end codes, including but not limited to Fountain and Raptor. Erasure end-to-end codes may be used at higher levels for situations where the physical layer code is constrained in some way (e.g., in the case of a proprietary code that is part of a commercial transceiver) such that the physical layer alone is inadequate to provide reliable data delivery across the channel. In this case, physical layer frames or code words may be erased by the physical layer decoder (and not delivered to higher layers). The erasure codes act to correct for such erasures.

CONCLUSION

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of designing and making the technology disclosed herein may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes (e.g., of designing and making the technology disclosed above) outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. An apparatus for transmitting information from a spacecraft to an optical receiver via a free-space optical communications channel, the apparatus comprising:
   a buffer to store data acquired by the spacecraft, the buffer receiving the data at a first rate;
   a plurality of optical transceivers, operably coupled to the buffer, to generate a plurality of optical signals from the data stored in the buffer;
   a wavelength-division multiplexer, in optical communication with the plurality of optical transceivers, to form a wavelength-division multiplexed (WDM) optical signal modulated at a second rate greater than the first rate from the plurality of optical signals;
   a telescope, in optical communication with the wavelength-division multiplexer, to transmit the WDM optical signal from the spacecraft to the optical receiver via the free-space optical communications channel;
   a sensor to detect a signal from the optical receiver; and
   a processor, operably coupled to the sensor, the buffer, and the plurality of optical transceivers, to cause the plurality of optical transceivers to generate the plurality of optical signals in response to the signal from the optical receiver.

2. The apparatus of claim 1, wherein at least one optical transceiver in the plurality of optical transceivers is configured to generate an optical signal modulated at a data rate of at least 100 Gigabits per second.

3. The apparatus of claim 1, wherein at least one optical transceiver in the plurality of optical transceivers is configured to generate a coherently modulated optical signal.

4. The apparatus of claim 1, wherein the telescope is configured to emit a beam with a divergence angle from 15 microradians (µrad) to 1,500 µrad.

5. The apparatus of claim 1, wherein the telescope has an aperture with a diameter from 0.1 centimeters (cm) to 10 cm.

6. The apparatus of claim 1, wherein:
   the sensor is configured to acquire a beacon from the optical receiver; and
   the processor is configured to determine a change in a pointing angle of the telescope based on the beacon acquired by the sensor.

7. The apparatus of claim 1, wherein the signal from the optical receiver comprises a repeat.

8. The apparatus of claim 1, further comprising:
   an encoder, operably coupled to the buffer, to encode data stored in the buffer with a forward error correction code.

9. The apparatus of claim 1, further comprising:
   an optical amplifier, in optical communication with the wavelength-division multiplexer, to amplify the WDM optical signal to a power level of at least 100 milliwatts.

10. The apparatus of claim 1, wherein the buffer has an output speed matched to an input speed of the plurality of optical transceivers.

11. The apparatus of claim 1, wherein the data stored in the buffer is prioritized for transmission according to a data delivery protocol.

12. The apparatus of claim 1, wherein the second rate is greater than 40 Gigabits per second.

13. A method of transmitting information from a spacecraft to an optical receiver via a free-space optical communications channel, the method comprising:
   receiving a signal from the optical receiver;
   reading, at the spacecraft, data encoded with a forward error correction code from a buffer at a first rate;
   generating, at the spacecraft, a plurality of optical signals from the data read from the buffer in response to the signal;
   forming, at the spacecraft, a wavelength-division multiplexed (WDM) optical signal modulated at a modulation rate greater than the first rate from the plurality of optical signals; and
   transmitting the WDM optical signal from the spacecraft to the optical receiver via the free-space optical communications channel.

14. The method of claim 13, wherein generating the plurality of optical signals comprises generating at least one optical signal at a data rate of at least 40 Gbps.

15. The method of claim 13, wherein generating the plurality of optical signals comprises coherently modulating at least one optical carrier.

16. The method of claim 3, wherein the signal from the optical receiver comprises a repeat request.

17. The method of claim 13, wherein transmitting the WDM optical signal comprises amplifying the WDM optical signal to a power level of at least 100 milliwatts.

18. The method of claim 13, wherein transmitting the WDM optical signal comprises forming a beam with a divergence angle from 15 microradians (µrad) to 1,500 µrad.

19. The method of claim 13, wherein transmitting the WDM optical signal comprises emitting a beam via a telescope having an aperture with a diameter from 0.1 centimeters (cm) to 10 cm.

20. The method of claim 13, further comprising:
   acquiring a beacon from the optical receiver.

21. The method of claim 13, further comprising:
   storing the data in the buffer at rate less than a product of the modulation rate and a duration between transmissions from the spacecraft.

22. An apparatus for transmitting information from a spacecraft to an optical receiver via a free-space optical communications channel, the apparatus comprising:
   a sensor to detect a signal from the optical receiver;
   a buffer to store data encoded with a forward error correction code;
   a processor, operably coupled to the buffer, to read the data stored in the buffer at a rate of at least 40 Gigabits per second (Gbps);
   a plurality of optical transceivers, operably coupled to the processor, to coherently modulate a plurality of optical signals with the data in response to the signal from the optical receiver;
   a wavelength-division multiplexer, in optical communication with the plurality of optical transceivers, to form a wavelength-division multiplexed (WDM) optical signal from the plurality of optical signals; and
   a telescope, in optical communication with the wavelength-division multiplexer, to transmit the WDM optical signal from the spacecraft to the optical receiver via the free-space optical communications channel.

* * * * *